United States Patent
Palazzotto et al.

(10) Patent No.: US 6,777,460 B2
(45) Date of Patent: Aug. 17, 2004

(54) CURING AGENTS FOR CATIONICALLY CURABLE COMPOSITIONS

(75) Inventors: Michael C. Palazzotto, Woodbury, MN (US); Stefan H. Gryska, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 17 days.

(21) Appl. No.: 10/328,520

(22) Filed: Dec. 23, 2002

(65) Prior Publication Data

US 2004/0122122 A1 Jun. 24, 2004

(51) Int. Cl.$^7$ .................... C08J 3/28; G03C 1/675; G03C 1/735
(52) U.S. Cl. .................... 522/25; 522/26; 522/29; 522/168; 522/170; 522/181; 522/182
(58) Field of Search .................... 522/25, 26, 29, 522/168, 170, 181, 182, 169

(56) References Cited

U.S. PATENT DOCUMENTS

| | | |
|---|---|---|
| 3,347,676 A | 10/1967 | Cripps |
| 3,708,296 A | 1/1973 | Schlesinger |
| 3,842,019 A | 10/1974 | Kropp |
| 4,069,055 A | 1/1978 | Crivello |
| 4,216,288 A | 8/1980 | Crivello |
| 4,250,311 A | 2/1981 | Crivello |
| 4,503,211 A | 3/1985 | Robins |
| 4,642,126 A | 2/1987 | Zador et al. |
| 4,652,274 A | 3/1987 | Boettcher et al. |
| 4,707,432 A | 11/1987 | Gatechair et al. |
| 4,889,792 A | 12/1989 | Palazzotto |
| 4,985,340 A | 1/1991 | Palazzotto et al. |
| 5,084,586 A | 1/1992 | Farooq |
| 5,089,536 A | 2/1992 | Palazzotto |
| 5,124,417 A | 6/1992 | Farooq |
| 5,545,676 A | 8/1996 | Palazzotto et al. |
| 5,554,664 A * | 9/1996 | Lamanna et al. .............. 522/25 |
| 5,962,546 A * | 10/1999 | Everaerts et al. .............. 522/25 |
| 6,025,406 A | 2/2000 | Oxman et al. |
| 6,265,459 B1 * | 7/2001 | Mahoney et al. .............. 522/17 |
| 6,635,689 B1 * | 10/2003 | Mahoney et al. .............. 522/18 |
| 2002/0022709 A1 | 2/2002 | Mader |
| 2004/0048943 A1 * | 3/2004 | Mahoney et al. .............. 522/66 |

FOREIGN PATENT DOCUMENTS

| | | |
|---|---|---|
| GB | 1 495 746 | 12/1977 |

OTHER PUBLICATIONS

"Encyclopedia of Polymer Science and Engineering", Second Edition, H. F. Mark, N. M. Bikales C. G. Overberger, G. Menges, J. I. Kroschwitz, Eds., vol. 2, John Wiley & Sons, New York (1985), pp. 729–814.

Photoinitiators for Free Radical Cationic & Anionic Photopolymerization, $2^{nd}$ Edition, J. V. Crivello & K. Dietliker, John Wiley and Sons, 1998, pp. 275 to 298.

* cited by examiner

*Primary Examiner*—Susan Berman
(74) *Attorney, Agent, or Firm*—Lorraine R. Sherman; Lucy C. Weiss

(57) ABSTRACT

Novel catalyst systems in cationically curable compositions provide colorless cationically cured compositions with improved degree of cure and thermal stability. The curable composition comprises at least one cationically curable monomer and a curing agent comprising Photocurative A or Photocurative B. Photocurative A comprises an effective amount of an accelerating photochemically active salt comprising a photochemically active cation and an accelerating anion, and an effective amount of an inhibiting non-photochemically active salt comprising a non-photochemically active cation and an inhibiting anion. Photocurative B comprises an effective amount of an inhibiting photochemically active salt comprising a photochemically active cation and an inhibiting anion, and an effective amount of an accelerating non-photochemically active salt comprising a non-photochemically active cation and an accelerating anion. The inhibiting and accelerating salts in photocuratives A and B are defined by photo differential scanning calorimetry (pDSC) and thermal differential scanning calorimetry (tDSC). The compositions are useful, for example, as optically colorless or low color coatings, adhesives, encapsulants, and sealants for optical and electronic applications.

24 Claims, No Drawings

CURING AGENTS FOR CATIONICALLY CURABLE COMPOSITIONS

FIELD OF THE INVENTION

Novel catalyst systems provide cationically photocured compositions with reduced color, improved degree of cure, and increased thermal stability. Such compositions are useful as optically colorless or low color coatings, adhesives, encapsulants, sealants and abrasives for optical and electronic applications.

BACKGROUND OF THE INVENTION

Salts that have an organic, inorganic or organometallic cation and a nonnucleophilic counteranion are widely used in industry as initiators, particularly photoinitiators, for cationic addition polymerization reactions. Common initiator salts include onium salts such as diaryliodonium, triarylsulfonium, and (cyclopentadienyl)(arene)iron$^+$ salts of the anions $PF_6^-$, $AsF_6^-$, or $SbF_6^-$. It has been well documented that the identity of the anion associated with the onium cation can significantly affect the rate of polymerization as well as the color and thermal stability of the resulting cured polymer. For example when a sulfonium $SbF_6^-$ salt is used to catalyze photocationic addition polymerization reactions, highly colored cured materials are generally produced whereas when a sulfonium $PF_6^-$ salt is used as the catalyst essentially colorless polymers result. Measurement of the degree of cure of these two systems, however reveals that while the sulfonium $PF_6^-$ catalyst produces a colorless product there is a high level of unreacted epoxy monomer present in it, producing thermal instability in the cured product. And the sulfonium $SbF_6^-$ salt, while producing a highly colored material, has essentially no unreacted epoxy as determined by infrared spectroscopy.

Recently it has been found that polymers catalyzed by anions having three highly fluorinated alkylsulfonyl, fluorinated arylsulfonyl or perfluoroalkylsulfonyl groups, and combinations thereof, exhibit very strong catalytic activity. For example, epoxy formulations that have a tris-trifluorosulfonylmethide ("methide") anion provide very rapid cures in cationic polymerization reactions. Although methide-containing initiators seem to be a direct replacement for $SbF_6^-$ anion-containing initiators in cationic addition polymerization reaction systems as far as cure rate is concerned, these systems impart significantly reduced thermal stability to the cured material.

SUMMARY OF THE INVENTION

Briefly, the present invention provides a curable composition comprising
 a. at least one cationically curable monomer, and
 b. a curing agent comprising Photocurative A or Photocurative B, wherein
  Photocurative A comprises
   1) an effective amount of an accelerating photochemically active salt comprising a photochemically active cation and an accelerating anion, and
   2) an effective amount of an inhibiting non-photochemically active salt comprising a non-photochemically active cation and an inhibiting anion; and
  Photocurative B comprises
   1) an effective amount of an inhibiting photochemically active salt comprising a photochemically active cation and an inhibiting anion, and
   2) an effective amount of an accelerating non-photochemically active salt comprising a non-photochemically active cation and an accelerating anion;
  wherein the inhibiting and accelerating anions are defined by photo differential scanning calorimetry (pDSC) and thermal differential scanning calorimetry (tDSC) such that anions of triarylsulfonium salts that have a total DSC exotherm energy value in the range of 0 to 300 Joules per gram (J/g), preferably 0 to 250 J/g, and more preferably 0 to 200 J/g, are classified as inhibiting anions, and anions of triarylsulfonium salts that have a total DSC exotherm energy value in the range of greater than 300 to 750 Joules per gram (J/g), preferably 325 to 600 J/g, and more preferably 350 to 500 J/g, are classified as accelerating anions.

In another aspect, the present invention provides curatives for producing high performance, cationically cured compositions, the curatives being designated Photocurative A and Photocurative B, as defined above.

In yet another aspect, the present invention provides a cured composition comprising the curable composition described above that has been subjected to curing conditions. These compositions preferably have one or more of the following characteristics: increased degree of cure, increased $T_g$, increased thermal stability, and reduced color or colorless cured compositions compared to conventional cationically cured compositions.

In a further aspect, the present invention provides a method for photopolymerizing a cationically polymerizable composition comprising Photocurative A or Photocurative B, as defined above, and subjecting the composition to photocuring conditions to produce high performance compositions.

Cationically polymerizable materials that can be cured or polymerized by the curatives of the present invention, using the latter in a catalytically effective amount, are those known to undergo cationic polymerization and include 1,2-, 1,3-, and 1,4-cyclic ethers (also designated as 1,2-, 1,3-, and 1,4-epoxides), vinyl ethers, N-vinyl compounds, ethylenically unsaturated hydrocarbons, cyclic formals, and cyclic organosiloxanes. An extensive list of cationically polymerizable monomers which can be used in this invention are given in U.S. Pat. Nos. 3,347,676 and 3,842,019, which patents are incorporated herein by reference.

We have found that the addition of additional anions to a conventional photochemically active initiator salt can improve the properties of a cationically cured composition depending upon the nature of the added anion and the anion of the photochemically active salt. It is the added anion that produces the effect. The anion can have any cation associated with it that does not interfere with the photochemical activity of the initiator salt.

This invention provides an improved catalyst system for cationically photocurable compositions. The invention utilizes conventional cationic initiators with the addition of effective amounts of additional anions. Choice of optimal initiator/anion combinations provide compositions with high performance characterics not previously achievable using conventional curatives. Colorless or low color compositions of the present invention can represent an improvement in the art compared to compositions made with conventional cationic initiator systems that can impart a deep yellow/brown color to the cured composition or have poor curing characteristics.

In this application:

"colorless", "low color", and "reduced color" means colorless to the naked eye, or reduced or lower in color compared to a corresponding polymer cured by a conventional photocurative. Conventional photocuratives are those known in the art to cure cationic monomers. Examples of conventional curatives include the photoinitiators mentioned in the background of this application and are disclosed, for example, in U.S. Pat. Nos. 4,250,311; 3,708,296; 4,069,055; 4,216,288; 5,084,586; 5,124,417; 4,985,340; 5,089,536; and 6,025,406;

"high performance" means having at least one of the following characteristics: increased degree of cure, increased $T_g$, increased thermal stability, reduced color or colorless cured compositions compared to conventional compositions;

"initiator" means a photochemically active salt;

"normal cure conditions" is defined as comprising the steps of exposing the sample to light, generally on the order of 1 to 2 Joules of UVA and if desired heating the composition to between 100 to 150° C. to complete cure;

"photochemically active compositions" are those that are cationically curable, such as epoxy and epoxy containing materials, and comprise a photochemically active salt;

"photochemically active salt" is one that, upon photolysis, produces an acid (can be a Bronsted ($H^+$) or Lewis acid ($M^{+n}$)) capable of initiating polymerization of cationically curable material;

"resin mixture" means a mixture of curable materials without a photochemically active salt;

"substituent" or "substituted" group means halogen or any other group that doesn't interfere with the polymerization or intended properties of the cured polymer;

"total DSC exotherm energy" means the sum of the photo DSC exotherm energy and the thermal DSC exotherm energy; and "UVA" means electromagnetic radiation between 320 nm to 390 nm in wavelength.

The present invention provides advantages in cationically cured compositions not heretofore seen in the art. Higher performance compositions (higher $T_g$ values, higher degree of cure, better thermal stability, etc.) that can be colorless or low color can be obtained that represent in improvement in the art compared to conventional single initiator systems that impart a deep yellow/brown color to the cured composition or have poor curing characteristics.

The invention provides cured polymers having one or more of the following characteristics: $T_g$ values (determined by DMA at 1 Hz as explained below) preferably at least 10° C. higher, more preferably at least 25° C. higher, and most preferably at least 50° C. higher than the $T_g$ of corresponding polymers cured by conventional curatives; percent weight loss (by TGA) preferably less than 10%, more preferably less than 8% and most preferably less than 6%; and degree of cure (measured by IR) of preferably greater than 80%, more preferably greater than 90%, and most preferably greater than 95%.

Catalysts for cationic addition photopolymerization reactions that produce compositions with long dark stability (before light exposure) and result in highly cured, colorless or low color, thermally stable products can be very useful in optically colorless coatings, adhesives, encapsulants, and sealants for optical and electronic applications. Improved dark stability can allow greater latitude in thermal processing of curable/thermoplastic blends, allowing the use of higher temperature thermoplastics or higher processing temperatures for lower viscosity extrusion conditions. Improved thermal stability of the cured compositions can allow higher operating temperatures of these materials and lower levels of outgassing that can be important to critical applications such as electronics (hard disk drives, for example) or in places that require stability in extreme environments (such as automotive applications). Improved thermal stability of the cured compositions can also be important to products used under stressful conditions, such as abrasives, where the use of the product generates heat that can contribute to product failure.

DETAILED DESCRIPTION OF PREFERRED EMBODIMENTS

Optimization of products of cationic polymerizations has been sought by those in the art. Often, even though a photochemically active salt produces an acid that potentially could polymerize a cationically curable material, poor polymerization can result from the presence of an inhibiting anion, an anion that does not favor complete polymerization. For example, $PF_6^-$ is an inhibiting anion for cationic polymerization of epoxies because it does not allow for complete polymerization under normal conditions (see comparative examples below). While $SbF_6^-$ is in general an accelerating anion for cationic polymerization, allowing for polymerization under normal conditions, it has the detrimental effect of producing highly colored compositions.

This invention relates to an improved catalyst system for cationically cured compositions. The compositions of the present invention contain at least one cationically polymerizable monomer. Suitable cationically polymerizable monomers and/or oligomers typically contain at least one cationically polymerizable group such as epoxides, cyclic ethers, vinyl ethers, side-chain unsaturated aromatic hydrocarbons, lactones and other cyclic esters, cyclic carbonates, cyclic acetals, aldehydes, cyclodiloxanes, cyclotriphosphazenes and mixtures thereof, preferably epoxides and vinyl ethers. Other cationically polymerizable groups or monomers are described in G. Odian, "Principles of Polymerization" Third Edition, John Wiley & Sons In., New York (1991) and "Encyclopedia of Polymer Science and Engineering", Second Edition, H. F. Mark, N. M. Bikales, C. G. Overberger, G. Menges, J. I. Kroschwitz, Eds., Vol 2, John Wiley & Sons, New York (1985), pp. 729–814 and are also useful in the practice of this invention.

Epoxy compounds that can be cured or polymerized by the processes of this invention are those known to undergo cationic polymerization and include 1,2-, 1,3-, and 1,4-cyclic ethers (also designated as 1,2-, 1,3-, and 1,4-epoxides). See the "Encyclopedia of Polymer Science and Technology", 6, (1986), p. 322, for a description of suitable epoxy resins. In particular, cyclic ethers that are useful include the cycloaliphatic epoxies such as cyclohexene oxide and the ERL™ and UVR™ series type of resins available from Dow Chemical, Midland, Mich., such as vinylcyclohexene oxide, vinylcyclohexene dioxide, 3,4-epoxycyclohexylmethyl-3,4-epoxycyclohexane carboxylate, bis-(3,4epoxycyclohexyl) adipate and 2-(3,4-epoxycylcohexyl-5,5-spiro-3,4epoxy) cyclohexene-meta-dioxane; also included are the glycidyl ether type epoxy resins such as propylene oxide, epichlorohydrin, styrene oxide, glycidol, the Epon™, Eponex™, and Heloxy™ series type of epoxy resins available from Resolution Performance Products, Houston, Tex., including the diglycidyl either of bisphenol A and chain extended versions of this material such as Epon 828, Epon 1001, Epon 1004, Epon 1007, Epon 1009 and Epon 2002 or their equivalent from other manufacturers, Eponex™ 1510, the hydrogenated diglycidyl either of bisphenol A, Heloxy™ 67, diglycidyl ether of 1,4-butanediol, Heloxy™ 107, diglycidyl ether of cyclohexane dimethanol, or their equivalent from other manufacturers, dicyclopentadiene dioxide, epoxidized vegetable oils such as epoxidized linseed and soybean oils available as Vikolox™ and Vikoflex™ resins from Atofina, Philadelphia, Pa., epoxidized Kraton Liquid™ Polymers, such as L207 available from Kraton Polymers, Houston, Tex., epoxidized polybutadienes such as the Poly BD™ resins from Atofina, Philadelphia, Pa., 1,4-butanediol diglycidyl ether, polyglycidyl ether of phenolformaldehyde, and for example DEN™ epoxidized phenolic novolac resins such as DEN 431 and, DEN 438 available from Dow Chemical Co., Midland Mich., epoxidized cresol novolac resins such as Araldite ECN™ 1299 available from Vantico AG, Basel, Switzerland, resorcinol diglycidyl ether, and epoxidized polystyrene/polybutadiene blends such as the Epofriend™ resins such as Epofriend A1010 available from Daicel USA Inc., Fort Lee, N.J., and resorcinol diglycidyl ether.

The preferred epoxy resins include the ERL™ and the UVR™ type of resins especially 3,4-epoxycyclohexylmethyl-3,4-epoxycyclohexanecarboxylate, bis-(3,4-epoxycyclohexyl) adipate and 2-(3,4-epoxycylclohexyl-5,5-spiro-3,4-epoxy) cyclohexene-meta-dioxane and the bisphenol A Epon™ type resins including 2,2-bis-p2,3-epoxypropoxy)phenylpropane and chain extended versions of this material and, resins of the type Eponex™ 1510 and Heloxy™ 107 and 68. Also useful in the present invention are purified versions of these epoxies as described in U.S. published patent application 2002/0022709 published 21 Feb. 2002.

When preparing compositions containing epoxy monomers, hydroxy-functional materials can be added. The hydroxyl-functional component can be present as a mixture or a blend of materials and can contain mono- and polyhydroxyl containing materials. Preferably, the hydroxy-functional material is at least a diol. When used, the hydroxyl-functional material can aid in chain extension and in preventing excess crosslinking of the epoxy during curing, e.g., increasing the toughness of the cured composition.

When present, useful hydroxyl-functional materials include aliphatic, cycloaliphatic or alkanol-substituted arene mono- or poly-alcohols having from about 2 to about 18 carbon atoms and two to five, preferably two to four hydroxy groups, or combinations thereof. Useful mono-alcohols can include methanol, ethanol, 1-propanol, 2-propanol, 2-methyl-2-propanol, 1-butanol, 2-butanol, 1-pentanol, neopentyl alcohol, 3-pentanol, 1-hexanol, 1-heptanol, 1-octanol, 2-phenoxyethanol, cyclopentanol, cyclohexanol, cyclohexylmethanol, 3-cyclohexyl-1-propanol, 2-norbornanemethanol and tetrahydrofurfuryl alcohol.

Polyols useful in the present invention include aliphatic, cycloaliphatic, or alkanol-substituted arene polyols, or mixtures thereof having from about 2 to about 18 carbon atoms and two to five, preferably two to four hydroxyl groups.

Examples of useful polyols include 1,2-ethanediol, 1,2-propanediol, 1,3-propanediol, 1,4-butanediol, 1,3-butanediol, 2-methyl-1,3-propanediol, 2,2dimethyl-1,3-propanediol, 2-ethyl-1,6-hexanediol, 1,5-pentanediol, 1,6-hexanediol, 1,8-octanediol, neopentyl glycol, glycerol, trimethylolpropane, 1,2,6hexanetriol, trimethylolethane, pentaerythritol, quinitol, mannitol, sorbitol, diethylene glycol, triethylene glycol, tetraethylene glycol, glycerine, 2-ethyl-2-(hydroxymethyl)-1,3-propanediol, 2-ethyl-1,3-pentanediol, 1,4cyclohexanedimethanol, 1,4benzene-dimethanol and polyalkoxylated bisphenol A derivatives. Other examples of useful polyols are disclosed in U.S. Pat. No. 4,503,211.

Higher molecular weight polyols include the polyethylene and polypropylene oxide polymers in the molecular weight ($M_n$) range of 200 to 20,000 such as the Carbowax™ polyethyleneoxide materials available from Dow Chemical Co., Midland, Mich., caprolactone polyols in the molecular weight range of 200 to 5,000 such as the Tone™ polyol materials available from Dow, polytetramethylene ether glycol in the molecular weight range of 200 to 4,000, such as the Terathane™ materials available from DuPont and PolyTHF™ 250 from BASF, polyethylene glycol, such as PEG™ 200 available from Dow, hydroxyl-terminated polybutadiene resins such as the Poly BD materials available from Atofina, Philadelphia, Pa., phenoxy resins such as those commercially available from Phenoxy Associates, Rock Hill, S.C., or equivalent materials supplied by other manufacturers.

It is also within the scope of this invention to include one or more epoxy resins which can be blended together. It is also within the scope of this invention to include one or more mono or poly-alcohols which can be blended together. The different kinds of resins and alcohols can be present in any proportion.

It is within the scope of this invention to use vinyl ether monomers as the cationically curable material. Vinyl ether-containing monomers can be methyl vinyl ether, ethyl vinyl ether, tert-butyl vinyl ether, isobutyl vinyl ether, triethyleneglycol divinyl ether (Rapi-cure™ DVE-3, available from International Specialty Products, Wayne, N.J.), 1,4-cyclohexanedimethanol divinyl ether (Rapi-cure CHVE, International Specialty Products), trimetylolpropane trivinyl ether (available from BASF Corp., Mount Olive, N.J.) and the Vectomer™ divinyl ether resins from Morflex, Greensboro, N.C., such as Vectomer 2010, Vectomer 2020, Vectomer 4010, and Vectomer 4020, or their equivalent from other manufacturers. It is within the scope of this invention to use a blend of more than one vinyl ether resin.

It is also within the scope of this invention to use one or more epoxy resins blended with one or more vinyl ether resins. The different kinds of resins can be present in any proportion.

Bi-functional monomers having both cationically polymerizable and free-radically polymerizable moieties in the same monomer are useful in the present invention, such as, for example, glycidyl methacrylate, or 2-hydroxyethyl acrylate.

It is also within the scope of this invention to add a free radically polymerizable monomer, such as an acrylate or methacrylate. The addition of such a monomer broadens the scope of obtainable physical properties and processing options. When two or more polymerizable monomers are present, they can be present in any proportion.

Suitable monomers include those with free-radically polymerizable moieties and contain at least one ethylenically-unsaturated double bond, can be oligomers, and are capable of undergoing addition polymerization. Such monomers are known in the art and include mono-, di-, or poly- acrylates and methacrylates such as methyl acrylate, methyl methacrylate, ethyl acrylate, isopropyl methacrylate, n-hexyl acrylate, stearyl acrylate, allyl acrylate, glycerol diacrylate, glycerol triacrylate, ethyleneglycol diacrylate, diethyleneglycol diacrylate, triethyleneglycol dimethacrylate, 1,3-propanediol diacrylate, 1,3-propanediol dimethacrylate, trimethylolpropane triacrylate, 1,2,4-butanetriol trimethacrylate, 1,4cyclohexanediol diacrylate, pentaerythritol triacrylate, pentaerythritol tetraacrylate, pentaerythritol tetramethacrylate, sorbitol hexacrylate, bis[1-(2-acryloxy)]-p-ethoxyphenyldimethylmethane, bis[1-(3-acryloxy-2-hydroxy)]-p-propoxyphenyldimethylmethane, trishydroxyethyl-isocyanurate trimethacrylate; the bis-acrylates and bis-methacrylates of polyethylene glycols of molecular weight 200–500, copolymerizable mixtures of acrylated monomers such as those of U.S. Pat. No. 4,652,274, and acrylated oligomers such as those of U.S. Pat. No. 4,642,126; unsaturated amides such as methylene bis-acrylamide, methylene bis-methacrylamide, 1,6-hexamethylene bis-acrylamide, diethylene triamine tris-acrylamide and beta-methacrylaminoethyl methacrylate; and vinyl compounds such as styrene, diallyl phthalate, divinyl succinate, divinyl adipate and divinylphthalate. Mixtures of two or more monomers can be used if desired. When present, the free radically polymerizable monomer can be present in any amount, but generally in the range of from 5 to 95% of the composition, preferably from 10 to 70%, and most preferably from 10 to 60%.

The free radical initiator can be selected from those compounds that generate free radicals upon exposure to heat or radiation, see for example those compounds disclosed in U.S. Pat. No. 4,707,432, which is incorporated herein by reference. They are selected from acetophenones and ketals, benzophenones, aryl glyoxalates, acylphosphine oxides, sulfonium and iodonium salts, and diazonium salts. The preferred additional free radical initiators that are light activated are those that have an absorption maximum in the 300 to 800 nm region. For a general description of the types of photo-nitiators that would be useful in the present invention, see Photoinitiators for Free Radical Cationic & Anionic Photopolymerization, 2$^{nd}$ Edition, J. V. Crivello & K Dietliker, John Wiley and Sons, 1998. A particularly useful list of commercially available free radical photoinitiators is given on pages 275 to 298. Photoinitiators that would be useful are benzophenone, benzoin ethyl ether, 2,2-dimethoxy-1,2diphenylethanone, a,a-diethoxyacetophenone, 1-hydroxy-cyclohexylphenol ketone, 2-hydroxy-2-methyl-1-phenyl propan-1-one, 1-[4-(2-hydroxyethoxy)phenyl]-2-hydroxy-2-methylpropan-1-one, 2-methyl-1-[4-(methylthio)phenyl]-2-morpholino-propan-1-one, 2-benzyl-2-dimethylamino-1-(4-morpholinophenyl)-butan-1-one, 2,4,6-trimethylbenzoyl-diphenylphosphine oxide, 2,4,6-trimethylbenzoyl-phenylphosinic acid ethyl ester, bis-2,4,6-trimethylbenzoyl)-phenylphosphine oxide and the like. These photoinitiators are available commercially from companies like Ciba Specialty Chemicals, BASF, Sartomer and numerous others. When used in the final curable composition, the free radical photoinititator may be used in amounts that as dissolved provide about 0.01 to 5.0 percent by weight of the total composition, preferably 0.1 to 2%. It is also within the scope of this invention to use the three-component photoinitiator systems described in U.S. Pat. Nos. 4,889,792 and 5,545,676 to initiate free radical polymerization. These photoinitiator systems produce compositions that have higher cure speed and extended wavelength sensitivity than those produced using conventional photoinitiators.

The composition of the present invention comprises conventional cationic initiators with the addition of salts that contain catalytically effective levels of additional anions. Selecting an optimal initiator/anion combination allows one to obtain the majority of the best attributes of two separate systems simultaneously. For example, if a conventional photoinitiator is selected that is a poor curative but produces a colorless or low color, partially cured composition, the addition of a non-photochemically active salt containing a selective additional anion in a catalytically effective amount can produce a cured composition that is still colorless or low color but also has higher performance characteristics (higher $T_g$, higher degree of cure, better thermal stability, etc.). Alternatively by adding a non-photochemically active salt containing a selected additional anion to a cationic photoinitiator system that produces a highly colored, cured composition with high performance characteristics it is possible to obtain a colorless or low color, cured composition with essentially the same level of high performance characteristics.

Surprisingly, it has been found in this invention that a source of accelerating anions (anions that do not inhibit cure) from a non-photochemically active source can be added to poorly curing photochemically active compositions to increase the cure and thereby improve the physical properties of the cured composition, such as degree of cure, $T_g$, thermal stability, etc. It has also been found that a source of inhibiting anions (anions that do inhibit cure) from the addition of a salt of a non-photochemically active cation can be added to good curing photochemically active compositions to maintain the cure and improve the physical properties of the cured composition, such as color, thermal stability, etc. A test method that involves measuring the thermal and photo DSC exotherm energies from the curing of a standard epoxy monomer system is used to differentiate accelerating anions from inhibiting anions. This "anion classification test" is described in detail in the Examples section, below. Any anions that give a total DSC exotherm value of between 0 to 300 J/g in this test are classified as inhibiting anions. Any anions that give a total DSC exotherm value of between greater than 300 to 750 J/g in this test are classified as accelerating anions.

The salts of the invention can be non-photochemically active salts or photochemically active salts. The cationic portion of the salt determines the photochemical activity of the salt. Non-photochemically active salts of the invention can be any salt whose cationic portion is: 1) not photochemically activated, 2) not a thermal initiator for cationic polymerization measured by the ability to induce cure above 50° C., more preferably above 100° C. and most preferably above 150° C., and 3) absorb light preferably below 500 nm, more preferable below 450 nm and most preferably below 400 nm. Acids themselves, for example $HPF_6$ or $HBF_4$, are not photochemically activated but the acid is known to catalyze the polymerization of cationically polymerizable monomers so they would be unsuitable as additives. Suitable non-photochemically active salts comprising cations of formulas such as, for example:

 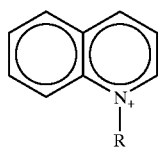

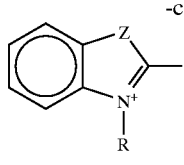

$$Z = O, S, C(R'')_2$$

$^+NRR'R''R'''$ $^+PRR'R''R'''$ wherein each R, R', R" and R'" is independently a substituted or unsubstituted alkyl group or an aryl group, acyl or benzoyl group. R and R' together can form a ring structure of from 4 to 8 carbon atoms or R, R' and R'" can be taken together to from a bicyclic ring structure of 2 to 8 carbons. Alkyl groups can have 1 to 12 carbon atoms and aryl groups can be of 1 to 3 fused rings (such as, for example, naphthalene) or joined rings (such as, for example, biphenyl) having up to 30 atoms each. The substitution on R, R', R" and R'" can be substituents such as halogen or any other group that doesn't interfere with the polymerization or intended properties of the cured polymer. Also simple ammonium salts of the formula NRR'R"R'", where up to two of the R, R', R", and R'" can be hydrogen, are within the scope of this invention.

The non-photochemically active salt can also have a cation such as $Li^+$, $Na^+$, $K^+$, $Cs^+$, $Ca^{+2}$ (i.e., salts of columns IA and IIA of the periodic table (CAS version)).

Preferably, the non-photochemically active salt is a simple elemental salt or the salt of a nitrogen containing cation.

Each cationic charge must be balanced by the appropriate number of anions, $X^-$, wherein $X^-$ is selected from the class of inhibiting or accelerating anions as determined by the anion classification method described below. Examples of inhibiting and accelerating anions as classified by this method are show in Table 1, below.

Photochemically active salts of the invention include a broad class of photoactive groups recognized in the catalyst and photoinitiator industries. Photoactive cationic nuclei, photoactive cationic moieties, and photoactive cationic organic compounds are art recognized classes of materials as exemplified by U.S. Pat. Nos. 4,250,311; 3,708,296; 4,069,055; 4,216,288; 5,084,586; 5,124,417; 4,985,340; 5,089,536; and 6,025,406.

Cations useful as the cationic portion of the photochemically active salt of the catalysts and initiators of the invention include (1) organic onium cations, for example those described in U.S. Pat. Nos. 4,250,311, 3,708,296, 4,069,055, 4,216,288, 5,084,586 and 5,124,417 and such descriptions incorporated herein by reference, including aliphatic or aromatic Group IVA–VIIA (CAS version) centered onium salts, preferably I-, S-, P- and C-centered onium salts, such as those selected from sulfoxonium, diaryliodonium, triarylsulfonium, carbonium and phosphonium, and most preferably I-, and S-centered onium salts, such as those selected from sulfoxonium, diaryliodonium, and triarylsulfonium, wherein "aryl" means an unsubstituted or substituted aromatic moiety having up to four independently selected substituents. The substituents on the aryl ring will preferably have less than 30 carbon atoms and up to 10 heteroatoms selected from N, S, non-peroxidic O, P, As, Si, Sn, B, Ge, Te, Se, examples include hydrocarbyl groups such as methyl, ethyl, butyl, dodecyl, tetracosanyl, benzyl, allyl, benzylidene, ethenyl, and ethynyl; hydrocarbyloxy groups such as methoxy, butoxy and phenoxy; hydrocarbylmercapto groups such as methylmercapto and phenylmercapto; hydrocarbyloxycarbonyl groups such as oxycarbonyl and phenoxycarbonyl; hydrocarbylcarbonyloxy groups such as acetoxy and cyclohexanecarbonyloxy; hydrocarbylcarbonamide groups such as acetamido and benzamido; azo; boryl; halo groups such as chloro, bromo, iodo and fluoro; hydroxy; oxy; diphenylarsino; diphenylstibino; trimethylgermano; trimethylsiloxy; and aromatic groups such as cyclopentadienyl, phenyl, tolyl, naphthyl, and indenyl. With the sulfonium salts, it is possible for the substituent to be further substituted with a dialkyl- or diarylsulfonium cation; an example of this would be 1,4-phenylene bis(diphenylsulfonium);

(2) organometallic complex cations essentially free of metal hydride or metal alkyl functionality selected from those described in U.S. Pat. No. 4,985,340 and such description is incorporated herein by reference and has the formula:

$$[(L^1)(L^2)M]^{+q} \qquad (I)$$

wherein

M represents a metal selected from the group consisting of Cr, Mo, W, Mn, Re, Fe, Ru, Os, Co, Rh, Ir, Pd, Pt and Ni, preferably Cr, Mo, W, Mn, Fe, Ru, Co, Pd, and Ni; and most preferably Mn and Fe;

$L^1$ represents 1 or 2 cyclic, polyunsaturated ligand that can be the same or different ligand selected from the group consisting of substituted and unsubstituted cyclopentadienyl, cyclohexadienyl, cycloheptatrienyl, cycloheptatriene, cyclooctatetraene, heterocyclic compounds and aromatic compounds selected from substituted or unsubstituted arene compounds and compounds having 2 to 4 fused rings, and units of polymer, e.g., a phenyl group of polystyrene, poly(styrene-co-butadiene), poly(styrene-co-methyl methacrylate), poly(α-methylstyrene), and the like; a cyclopentadiene group of poly (vinylcyclopentadiene); a pyridine group of poly (vinylpyridine), and the like, each capable of contributing 3 to 8 electrons to the valence shell of M;

$L^2$ represents none, or 1 to 3 nonanionic ligands contributing an even number of electrons that can be the same or different ligands selected from the group of carbon monoxide, ketones, olefins, ethers, nitrosonium, phosphines, phosphites, and related derivatives of arsenic and antimony, organonitriles, amines, alkynes, isonitriles, dinitrogen, with the proviso that the total electronic charge contributed to M results in a net residual positive charge of q to the complex; q is an integer having a value of 1 or 2, the residual charge of the complex cation, and each cationic charge must be balanced by the appropriate number of anions, $X^-$; wherein $X^-$ is selected from the class of inhibiting or accelerating anions as determined by the anion classification method Preferred photochemically active cations include substituted and unsubstituted (cyclopentadienyl)Fe(arene)$^+$, substituted and unsubstituted aryliodonium and substituted and unsubstituted arylsulfonium and mixtures thereof. Useful curative components for the present invention include:

Photocurative A which comprises:

an accelerating photochemically active salt comprising a photochemically active cation and an accelerating anion (an anion classified as accelerating by the anion classification test method described below). Examples include but are not limited to diaryliodonium, triarylsulfonium, and cationic organometallic salts of $AsF_6^-$, $SbF_6^-$, $CF_3SO_3^-$, $C(SO_2CF_3)_3^-$ (also called "methide"), $HC(SO_2CF_3)_2^-$, $N(SO_2CF_3)_2^-$, tetra(pentafluorophenyl)borate, tetra(3,5-bistrifluoromethylphenyl)borate; and an inhibiting non-photochemically active salt comprising a non-photochemically active cation and an inhibiting anion (an anion classified as inhibiting by the anion classification test method described below). Examples include but are not limited to tetraalkylammonium, phosphonium, pyridinium, benzothiazolium, benzooxazolium, $Li^+$, $Na^+$, $K^+$, $Cs^+$, $Ca^{+2}$ (i.e., cations of columns IA and IIA of the periodic table (CAS version)) salts of $BF_4^-$, $PF_6^-$, p-toluenesulfonate, and tetraphenylborate; or Photocurative B which comprises:

an inhibiting photochemically active salt comprising a photochemically active cation and an inhibiting anion (an anion classified as inhibiting by the anion classification test method). Examples include but are not limited to diaryliodonium, triarylsulfonium, and organometallic salts of $BF_4^-$, $PF_6^-$, p-toluenesulfonate, substituted and unsubstituted tetraphenylborate; and an accelerating non-photochemically active salt comprising a non-photochemically active cation and an accelerating anion (an anion classified as accelerating by the anion classification test method). Examples include but are not limited to tetraalkylammonium, phosphonium, pyridinium, benzothiazolium, benzooxazolium, $Li^+$, $Na^+$, $K^+$, $Cs^+$, $Ca^{+2}$, (i.e., cations of columns IA and IIA of the periodic table (CAS version)) salts of $AsF_6^-$, $SbF_6^-$, $CF_3SO_3^-$, $C(SO_2CF_3)_3^-$, $HC(SO_2CF_3)_2^-$, $N(SO_2CF_3)_2^-$, tetra(pentafluorophenyl)borate, and tetra(3,5-bistrifluoromethylphenyl)borate.

The amount of the photochemically active salt used can vary over a wide range, from 0.01 to 20%, preferably 0.1 to 10%, most preferably 0.2 to 5% by weight of the total resin amount. The non-photochemically active salt used can also vary over a range of from 0.01 to 10% preferably from 0.1 to 5% by weight of the total resin amount. Particular attention must be given to the amount of non-photochemically active salt of an inhibiting anion added to the photochemically active salt of an accelerating anion. The addition of too much non-photochemically active salt of an inhibiting anion to the curable composition of the invention can result in reduced levels of cure, thereby producing cured materials with poor performance (lower $T_g$ and decreased thermal stability).

In the preparation of the curable compositions of the present invention, solvents can be used to assist in dissolution of the photochemically active and non-photochemically active salt in the cationically-sensitive material to prepare the photocurable compositions. Representative solvents include acetone, methyl ethyl ketone, cyclopentanone, methyl cellosolve acetate, methylene chloride, γ-butyrolactone, propylene carbonate, and methylsulfolane.

It is possible to prepare the curable compositions of the invention without the use of solvents. It is generally preferable not to use a solvent because they are generally unreactive and can form an uncured residue of the final composition. Because the photochemically active salts of the present invention are inactive unless exposed to light, it is possible to use heat to dissolve and mix the components of the curable composition without the need to resort to the use of solvents. It is preferable to use temperatures between 50 and 200° C., more preferably between 80 and 150° C., most preferably to use temperatures between 80 and 120° C. It is advisable to maintain the upper temperature of mixing safely below that of the thermal activation temperature of the photochemically active salt and non-photochemically active salt. Use of lower temperatures allows a compromise of fast mixing and preventing unwanted gelation of the curable composition. While heating, the compositions can be mixed by simple agitation, using a mechanical stirrer or other means. The components can be mixed in any order, but it is preferable to add the liquid components of the composition first, then to add the solid materials. This order aids in better mixing of the composition.

Since the compositions of the invention are radiation-sensitive, any source of radiation emitting active radiation in the ultraviolet and visible region of the spectrum (e.g., about 200 to 800 nm) can be used. Suitable sources of radiation include mercury vapor discharge lamps, carbon arcs, tungsten lamps, xenon lamps, sunlight, lasers, light emitting diodes etc. The required amount of exposure to effect polymerization is dependent upon such factors as the identity and concentration of the photochemically active salt, the particular cationically-sensitive monomer, the thickness of the exposed material, type of substrate, intensity of the radiation source and amount of heat associated with the radiation.

It is within the scope of this invention to include two-stage polymerization (curing), by first activating the curing agent by irradiating the curable compositions and subsequently thermally curing the activated precursors so obtained, the irradiation temperature being below the temperature employed for the subsequent heat-curing. The activated precursors may normally be cured at temperatures which are substantially lower than those required for the direct thermal curing, with an advantage in some cases in the range from 50° to 150° C. This two-stage curing also makes it possible to control the polymerization in a particularly simple and advantageous manner. Means for applying heat to the photoactivated composition of the present invention include, but are not limited to, conventional ovens, induction heating, infra-red radiation, microwave radiation, and immersion into liquid baths.

Adjuvants such as solvents, pigments, abrasive granules, stabilizers, light stabilizers, antioxidants, flow agents, bodying agents, flatting agents, dyes, inert fillers, binders, blowing agents, fungicides, bacteriocides, surfactants, plasticizers, and other additives as known to those skilled in the art can be added to the compositions of this invention. These can be added in an amount effective for their intended purpose.

Compositions of this invention may be applied, preferably as a liquid, to a substrate such as steel, aluminum, copper, cadmium, zinc, ceramic, glass, paper, wood, or various plastic films such as poly(ethylene terephthalate), plasticized poly(vinylchloride), poly(propylene), poly(ethylene), and the like, and irradiated. By polymerizing part of the coating, as by irradiation through a mask, those sections which have not been exposed may be washed with a solvent to remove the unpolymerized portions while leaving the photopolymerized, insoluble portions in place. Thus, compositions of this invention may be used in the production of articles useful in the graphic arts such as printing plates and printed circuits. Methods of producing printing plates and printed circuits from photopolymerizing compositions are well known in the art (see for example British Patent Specification No. 1,495,746) which is incorporated herein by reference.

Compositions of this invention are useful for coatings, foams, shaped articles, adhesives, filled or reinforced composites, abrasives, caulking and sealing compounds, casting and molding compounds, potting and encapsulated compounds, impregnating and coating compounds, and other applications which are known to those skilled in the art.

The unique curatives of the present invention provide polymers useful where low color coatings, adhesives, encapsulants, and sealants are desired, particularly in optical and electronic applications. Colorless hardcoats can be produced for any surface where cosmetic appearance is important, as for example, for floors, tables, electronic displays, wood surfaces, scratch resistant surfaces on household appliances, automobiles, or boats, as connectors for fiber optical cements. Colorless adhesives or coatings can be produced for high temperature performance devices in aeronautics, automobiles, electronics (TV sets, etc.).

Objects and advantages of the invention are further illustrated by the following examples, but the particular materials and amounts thereof recited in these examples, as well as other conditions and details, should not be construed to unduly limit this invention.

EXAMPLES

All Mixtures are Parts by Weight Unless Otherwise Stated.

Materials:

CD1010 triarylsulfonium $SbF_6^-$ salt from Sartomer Company, Exton, Pa., approximately a 50% salt in propylene carbonate CD-1011 triarylsulfonium $PF_6^-$ salt from Sartomer, approximately a 50% salt in propylene carbonate UVI-6974 triarylsulfonium $SbF_6^-$ salt from Dow, Midland, Mich., approximately a 50% salt in propylene carbonate.

UVI-6990 triarylsulfonium $PF_6^-$ salt from Dow, Midland, Mich., approximately a 50% salt in propylene carbonate.

ERL-4221 cycloaliphatic epoxide from Union Carbide (now Dow, Midland, Mich.).

ERL-4221E base washed cycloaliphatic epoxide from Union Carbide (now Dow, Midland, Mich.).

ERL-4221D base washed and distilled cycloaliphatic epoxide from Union Carbide (now Dow)

UVR-6110 cycloaliphatic epoxide from Union Carbide (now Dow)

Epon 828 glycidyl ether epoxide from Shell (Resolution Performance Products, Houston, Tex.

Tone 0201 caprolactone chain extended diol from Union Carbide (now Dow)

Polypropylene glycol 425 (PPG 425) diol from Aldrich Chemical, Milwaukee Wis.

Synfac™ 8017 bisphenol A based diol from Milliken Chemical, Spartanburg, S.C.

PolyTHF250 diol from BASF Corp, Parsippany, N.J.

MPDIOL™ short chain diol from ARCO Chemical Co, Newtown Square, Pa.

Tetrabutylammonium $PF_6^-$ from Southwestern Analytical Chemicals, Austin, Tex.

Tetrabutylammonium $BF_4^-$ from Southwestern Analytical Chemicals, Austin, Tex.

Tetrabutylammonium p-toluenesulfonate from Aldrich Chemical, Milwaukee Wis.

Tetrabutylammonium tetraphenylborate, Aldrich Chemical, Milwaukee Wis.

Lithium triflate, Li $CF_3SO_3$, FC-122, 3M Company, St Paul, Minn.

General Preparation of Curable Compositions:

Samples were prepared by mixing the photochemically active salt, non-photochemically active salt (if used), epoxy and polyol (if used) in brown bottles and heating at 80 to 100° C. until the compositions were thoroughly mixed. Higher temperatures and longer times were needed to completely dissolve compositions containing some of the additives. Compositions were allowed to cool to room temperature before use. The mixing of the solutions was carried out in ordinary laboratory lighting. All ratios are based on weight.

Dose/Energy Measurements:

Measurements of the light intensity and dose were made using either a UVIMAP™ or UV Power Puck™ radiometer from EIT, Sterling, Va. The dose is generally reported as the UVA range and is given in either J (Joules) or mj (milliJoules). Power (intensity) is generally reported for the UVA range and is given in either W (Watts) or mw (milliwatts).

Cured Material Preparation:

Cured samples were prepared using (he following steps: 1) Onto an aluminum plate approximately 23 cm×46 cm×0.64 cm was placed an approximately 15 cm×25 cm piece of 51 μm thick 3M silicone release liner, 2) on top of the release liner was placed a 356 μm thick silicone rubber mold. The mold for preparing DMA samples was prepared by taking about a 20 cm long×5–7.5 cm wide piece and cutting a strip from the rubber mold using a 0.64 cm wide cutting tool, the mold for preparing multiple small diameter samples was prepared by taking a 30.5 cm long×5–7.5 cm wide strip and using a 0.64 cm hole punch to prepare the required number of samples spaces, 3) then the mold was filled with the curable compositions taking care to avoid bubbles, 4) then a second piece of approximately 15 cm×25 cm of 51 μm thick 3M silicone release liner was placed on top of the filled mold, and 5) finally, a rubber roller was used to smooth out the sample and make it more uniform A conveyor belt/600W lamp system from Fusion UV Systems Inc, Gaithersburg, Md., was used to give the samples a specified level of UVA dose. The 600W Fusion D bulb was used in all cases described herein. Generally, the belt speed was adjusted so that the sample received 1 Joule/$cm^2$ per pass of UVA as measured through the 51 μm thick 3M silicone release liner (approximately 3–3.4 W/$cm^2$ intensity) by an EIT UVIMAPP. This was generally 0.61 m/minute for the system used here. The samples were passed under the lamp for the desired number of times to reach the specific desired dose. Sometimes a glass plate (10 cm×30.5 cm×0.64 cm Pyrex) was placed on the sample after it had received its total UV dose.

After exposure to the desired WVA dose, a 10 cm×30.5 cm×0.64 cm Pyrex glass plate was placed on the sample (if it had not already been done so) and the samples were post cured using an oven for 15 minutes at each temperature 50, 75, 100, 120 and 140° C. After the prescribed post cure, the samples were removed from the oven and allowed to reach room temperature before any measurements were made.

Photo-differential Scanning Calorimetry(pDSC)/Thermal Differential Scanning Calorimetry (tDSC) Measurements:

These measurements allow one to determine the relative speed (from the Time to Reach Peak Maximum), efficiency/degree of cure (from the energy liberated during the polymerization) and temperature required for any post cure (from the Peak Maximum in the DSC after pDSC). pDSC/tDSC measurements were made using a Model 920 Photocalorimeter from Dupont. Open liquid sample pans from Rheometric Scientific, Piscataway, N.J. were used for the light exposure part of the test. Sample size was 6–8 mg. Samples were irradiated with a specified time exposure at 30° C. using a 200W Hg bulb that delivered 60–62 mw UVA at the sample as measured by a EIT Power Puck. After the light exposure step, the samples were capped and a thermal DSC scan was run from room temperature to 300° C. at 10° C./minute. The resulting pDSC and tDSC traces were analyzed using software supplied with the instrument. For a general description of the pDSC technique, see Research & Development, November, 1987, pages 86–90.

Determination of Tg by Dynamic Mechanical Analysis (DMA) Measurements:

All $T_g$ values reported below were measured by dynamic mechanical analysis (DMA) unless otherwise noted. The measurements were made on a sample of approximately 10 mm by 0.5 mm in size. A Sieko Instruments, Torrance, Calif., DMA unit operating in tensile mode was used to perform the measurement. The test was performed by first cooling the sample to approximately −60° C., then ramping the temperature to 300° C. at 2° C./minute. The oscillation frequency used was 1 Hz. The resulting DMA trace was analyzed with software provided with the instrument. The $T_g$ was determined by the maximum in the tan δ peak. If there are two $T_g$ values listed in a table, this indicates that there were two separate tan δ peaks in the DMA. When a shoulder was present on the main tan δ peak, this is indicated by the (sh) designation in the table.

Modulated DSC (MDSC) Measurements:

Where indicated, $T_g$ was measured by modulated Differential Scanning Calorimetry (MDSC). The $T_g$ determined by this method was generally lower than that determined by DMA. These measurements were made on samples of cured material punched/cut from a larger sample and had a size generally in the 8–12 mg size. The measurements were made on a MDSC unit from TA Instrument Co., New Castle, Del., Sample measurements were made by scanning from −50 to 300° C. at 3° C./minute ramp rate and a modulation of +/−0.60° C./minute amplitude and 100 sec frequency. The resultant MDSC trace was analyzed with software provided with the instrument.

Weight Loss Measured by Thermogravimetric Analysis (TGA):

The thermal stability of the material was determined by measuring weight loss as a function of temperature (TGA). TGA measurements were made on samples of cured material punched/cut from a larger sample and had a size generally in the 5–10 mg size. The measurements were made on a TGA unit from TA Instrument Co. The measurements were made under an atmosphere of nitrogen and samples were heated to 350° C. at 10° C./minute. The resultant TGA trace was analyzed with software provided with the instrument. The percent weight lost at 275° C. was reported.

Infrared (IR) Measurements:

The percent of uncured material present in a sample was determined by IR spectroscopy. A Nexus 625 FTIR from Nicolet, Madison, Wis., was used to take the IR measurements. Samples were cut from a cured material of about 0.3 to 0.5 mm thickness and placed in the IR using an appropriately sized holder (sampling diameter approximately 5–7 mm). Uncured resins were examined by using a sandwich construction of approximately the same thickness as the cured materials. A ring cut from the same silicone rubber used to prepare the samples was used as a spacer between two salt plates. The resultant IR traces were analyzed using software provided with the instrument. Overlays of the various spectra were produced using GRAMS™ software, from Galactic Industries Corp., Salem, N.H., facilitating the easy comparison of samples and quick determination of relative degree of cure.

Color Determination:

Samples were classified as having residual color or not by simple visual inspection of the cured sample against a white background (a piece of white paper for example).

Preparation of Soluble Salts:

If the desired non-photochemically active salt was not available commercially in a convenient form (for example, a more organic soluble tetrabutylammonium salt), it was prepared by generally known synthetic techniques. For example, a tetrabutylammonium bromide salt can be used to prepare various salts by a simple metathesis procedure. For example, to prepare the $SbF_6^-$ salt, 50 g of tetrabutylammonium bromide (Aldrich Chemical Company) was combined with 43.8g of sodium hexafluoroantimonate (Ozark-Mahoning, Tulsa, Okla.) in 250 nl of methylene chloride and refluxed for a total of 7 hours. This procedure was used because of the known hydrolytic nature of $SbF6^-$ in neutral or basic aqueous solution. After allowing the solution to cool, the solution was filtered and the remaining solid extracted with an additional 200 ml of methylene chloride. The methylene chloride solution was washed twice with water then dried by passing it over Drierite™ (W. A. Hammond Drierite Company LTD, Xena, Ohio). The solvent was removed under reduced pressure and the white solid that was obtained was dried in a vacuum oven at 100° C. overnight. The product was characterized by IR and NMR. The results were consistent with the formation of the desired tetrabutylammonium $SbF_6^-$ salt.

Tetrabutylammonium methide ($C(SO_2CF_3)_3$) was prepared by doing a metathesis reaction using the methide acid, $HC(SO_2CF_3)_3$. and a source of tetrabutylammonium cation ($TBA^+$), TBA $HSO_4$ (Aldrich Chemical Company). For the preparation of the methide acid, see Inorganic Chemistry, 1988, 27, 2135–2137. To a 2 liter beaker was added 100 g of the methide acid (formula weight 412 g, approximately 20–25% acid in an aqueous solution), about 300 ml of distilled water and a stir bar. In a separate beaker, 20.4 g of TBA $HSO_4$ (formula weight 339.54 g) was dissolved in about 100 ml of distilled water and then slowly added to the methide acid solution. As the two solutions were mixed, a white precipitate was formed. As more precipitate formed the stirring was switched to an air-powered stirrer for better mixing. Because of the presence of the acid, the solution was neutralized with sodium bicarbonate until the solution became slightly basic when tested with pH paper. The white solid was filtered off using glass fritted funnel and a suction filter flask. The product was washed twice with about 100 ml of distilled water. The product was allowed to dry on the filter then it was transferred into a glass drying dish. The product was then placed in a vacuum oven set at 80° C. and pumped on it overnight to drive off the water.

At the oven temperature of 80–90° C., the product melted to form a viscous liquid. The product resolidified when allowed to stand at room temperature for about an hour. 38–40 g of crude material was produced. The product was dissolved in about 250 ml of acetone, filtered through a small fine filter because of the fine solids present. The solvent volume was reduced under reduced pressure and isopropanol was added. Sequential reduction of solvent volume and adding aliquots of isopropanol produced fine, white crystals. The white crystalline product was filtered off using a fritted glass funnel and a suction filter flask, washed twice with isopropanol and twice with petroleum ether. The product was allowed to dry on the filter. This procedure produced 31.5 g of a fine white crystalline solid. The product was placed in a vacuum oven set at room temperature overnight to remove any residual solvent. Analysis of the product by NMR and IR was consistent with the desired product, tetrabutylammonium methide.

Other salts can be made by slight variations in the aforementioned procedures. For example, other tetraalkylammonium, phosphonium, pyridinium, etc, cationic salts can be substituted for the tetrabutylammonium salt. Other anion sources, for example, $HBF_4$, ammonium hexafluorophosphate, etc. can be substituted for the methide acid or sodium hexafluoroantimonate. All of these synthetic methods are known to those skilled in the art of salt preparation.

Anion Classification Test Method:

In general, it has been found that a source of "accelerating" anions (anions that did not inhibit cure) from a non-photochemically active source when added to poorly curing photochemically active compositions increases the degree of cure of the cured composition and thereby improves the physical properties of the cured composition, such as degree of cure, $T_g$, thermal stability, etc. It is important that the non-photochemically active salt itself not be an active thermal catalyst for the initiation of cationic polymerization or the benefits of having a triggerable (light activated) curable composition are negated. For example, an acid salt of an anion that is non-photochemically active but induces the cure of a cationic system at moderate temperatures (room temperature to 50° C.) may not be useful in this invention since it would cause poor shelf stability of the composition. It is preferable that the non-photochemically active salt itself induce cure above 50° C., more preferably above 100° C. and most preferably above 150° C.

It has also been found that that a source of "inhibiting" anions (anions that do inhibit cure) from a non-photochemically active source when added to good curing photochemically active compositions maintains the degree of cure and improves the physical properties of the cured composition, such as color, thermal stability, etc.

A method to differentiate the "accelerating" anions from the "inhibiting" anions is described below.

If the desired photochemically active salt of a triarylsulfonium salt was not available commercially, it was prepared by generally known synthetic techniques. For example, a triarylsulfonium chloride salt solution (it is known in the art that this is a mixture of salts and is not a single compound) from Aceto Corp., Lake Success, N.Y., was used to prepare various salts by a simple metathesis procedure. For example, to prepare the $BF_4^-$ salt, a solution of triarylsulfonium chloride (usually supplied as a 50% solution in water) was mixed with the appropriate amount of $HBF_4$ (usually supplied as an aqueous solution, for example as a 48% aqueous solution from Aldrich Chemical). Upon mixing, the triarylsulfonium $BF_4^-$ separated out This product was extracted into methylene chloride, washed with an aqueous solution of sodium bicarbonate to remove any residual acid, washed with an aqueous solution of sodium chloride, dried over calcium sulfate, and the solvent removed to yield the desired salt. The source of the desired anion could come from another salt, like ammonium $PF_6^-$. In this manner suitable photochemically active salts were prepared for the test procedure.

The anion classification test was then carried out to classify the anion portion of the triarylsulfonium salt as an "inhibiting" anion or an "accelerating" anion. In this test a resin mixture of an epoxy and polyol, 20% Tone 0201, 80% ERL-4221 (Tone 0201 and ERL-4221 are products of the DOW Chemical Company, Midland, Mich.) was used. The compositions were prepared in 30 ml brown bottles to eliminate unwanted light exposure while handling the heated compositions. The weighing out of materials was carried out in lab lights. The amounts of the salts listed in Table 1 below were added to 20 g of this stock solution generally in the ratio of 1 part photoactive salt/100 part resin mixture. The compositions were heated in an oven at 100° C. until the dissolution of the salt was complete, generally less than 30 minutes. The solutions were allowed to cool before proceeding with the test. For Test Samples I and II, the compositions were prepared by weighing out 0.4 g of either UVI-6974 or UVI-6990, adding 4 g of Tone 0201 and 16 g of ERL-4221. These samples were heated in an oven at 80° C. until mixing was complete. The samples were allowed to cool to room temperature before conducting the test.

Because of the brief exposure to lab lights, the pDSC sample preparation was carried out under room lights. Liquid DSC hermetic sample pans from Rheometric Scientific, Piscataway, N.J., were used and the sample size was in the 6 to 8 mg range. A Dupont 912 DSC dual sample unit equipped with a 930 PhotoDSC Accessory was used for the pDSC/tDSC test. This instrument had a 200 Watt Hg bulb light source with a controllable shutter that delivers about 60 mw/cm$^2$ UVA as measured with an EIT UV Power Puck. The test comprised. 1) placing the sample in the sample cell of the photo DSC, 2) subjecting the sample held at 30° C. to an exposure cycle of 2 minutes with the shutter closed, 5 minutes shutter open (sample was exposed to light during this time period) followed by 2 minutes shutter closed. 3) removing the sample and sealing it, 4) running a standard DSC scan of 10° C./minute to 300° C. The exotherm energy in J/g was calculated by integrating the exotherm from the light exposure portion of the test and combining it with the exotherm energy from the thermal DSC scan. In the thermal DSC scan, only the energy below 250° C. was integrated. In the light exposure portion of the test, it was important to take account of the portion of the exotherm that was simply due to heating of the sample by the lamp and was not cure energy. The software in the Dupont systems allowed the calculation to be easily accomplished.

"Accelerating" and "inhibiting" anions can be readily identified by looking at the total DSC exotherm energy of the triarylsulfonium salts of these anions. Any triarylsulfonium salt with a total DSC exotherm energy less than or equal to 300 J/g (preferably 0 to 300 J/g) allowed for the classification of the anion of that salt as an "inhibiting" anion while any triarylsulfonium salt with a total DSC exotherm energy greater than 300 J/g (preferably greater than 300 to about 750 J/g) allowed for the classification of the anion of that salt as an "accelerating" anion. The anion classification results of these test procedures are shown in Test Procedure Table 1.

Although the anion classification test can distinguish accelerating from inhibiting anions for triarylsulfonium salts, the results of the test enables the identification of anions of cations of other useful cationic curatives, such as onium or organometallic salts. For example, triarylsulfonium $SbF_6$ had a DSC exotherm energy of 370.1 J/g (see Table 1). This classifies it as an accelerating salt and $SbF_6^-$ as an accelerating anion. Any other salts of $SbF_6^-$ are also considered to be accelerating salts since they contain an accelerating anion.

From the results of this test it was possible to predict that an accelerating anion like $SbF_6^-$ from a non-photochemically active source when added to a poor curing photochemically active salt like triarylsulfonium $PF_6^-$ provided a combination that improved the cure and performance of the composition.

Likewise, it was possible to predict that an inhibiting anion like $PF_6^-$ from a non-photochemically active source when added to a good curing photochemically active salt like triarylsulfonium $SbF_6^-$ provided a combination that improve the performance of the composition.

TABLE 1

Anion Classification

| Test Sample | Photochemically Active Salt | Total DSC Exotherm Energy, J/g | Classification of Anion |
|---|---|---|---|
| I | 0.4 g 2% UVI-6974 | 370.1 | accelerating |
| II | 0.4 g 2% UVI-6990 | 145.5 | inhibiting |
| III | triarylsulfonium Ph—C—(SO$_2$CF$_3$)$_2$* | 387.8 | accelerating |

TABLE 1-continued

Anion Classification

| Test Sample | Photochemically Active Salt | Total DSC Exotherm Energy, J/g | Classification of Anion |
|---|---|---|---|
| IV | triarylsulfonium $BF_4$ | 161.7 | inhibiting |
| V | triarylsulfonium NC—N—CN | no exotherm in pDSC or tDSC | inhibiting |
| VI | triarylsulfonium HC—$(SO_2CF_3)_2$ | 361.3 | accelerating |
| VII | triarylsulfonium $CF_3SO_3$ | 485.1 | accelerating |
| VIII | triarylsulfonium $CH_3$—Ph—$SO_3$* | 11 | inhibiting |
| IX | triarylsulfonium $N(SO_2CF_3)_2$ | 419.2 | accelerating |
| X | triarylsulfonium $C(CN)_3$ | 34 | inhibiting |
| XI | triarylsulfonium $N(SO_2C_4F_9)_2$ | 412.8 | accelerating |
| XII | triarylsulfonium $C(SO_2CF_3F_3)_3$ | 406.4 | accelerating |

*Ph = phenyl

In the following, Comparative Examples are denoted by letters while the Examples of the subject invention are denoted by numbers.

EXAMPLE 1

Properties of Comparative Formulations (No Added Salts)

Curable compositions were prepared using the general sample preparation method described above. DMA molds were used and the samples were given a total of 4 J/cm2 dose using the 600W Fusion D system and a post cure as described in the sample preparation section. The amounts of material used and the results of the DMA, IR and visual color evaluation tests are shown in Comparative formulations Table 2, below.

TABLE 2

Properties of Comparative Formulations (no added salts) Exposed to 4 J/cm²

| Comparative Sample | UVI-6990 | UVI-6974 | Tone 0201 | ERL-4221 | Color | $T_g$, °C. | Cure Estimate from IR |
|---|---|---|---|---|---|---|---|
| A | 0.4091 g | None | 4 g | 16 g | colorless | 51 | 68% |
| B | 0.3119 g | 0.1020 g | 4 g | 16 g | light brown | 136 | 100% |
| C | 0.2562 g | 0.1531 g | 4 g | 16 g | light brown | 124 | 100% |
| D | 0.2014 g | 0.2183 g | 4 g | 16 g | light brown | 120 | 100% |
| E | 0.1528 g | 0.2622 g | 4 g | 16 g | light brown | 119 | 100% |
| F | 0.1059 g | 0.3210 g | 4 g | 16 g | light brown | 122 | 100% |
| G | 0.0497 g | 0.3608 g | 4 g | 16 g | light brown | 125 | 100% |
| H | none | 0.4214 g | 4 g | 16 g | light brown | 120 | 100% |

The Comparative Samples of Table 2 show that it is not possible to obtain both a high degree of cure and a colorless product in a cured formulation by mixing a photochemically active salt of an inhibiting anion such as triarylsulfonium $PF_6^-$ (UVI-6990) with an accelerating anion of another photochemically active salt such as triarylsulfonium $SbF_6^-$ (UVI-6874). The composition containing only the triarylsulfonium $PF_6^-$ salt (Comparative Example A) produced a colorless material but its $T_g$ was about 65° C. to 85° C. less than the other compositions, and its cure was less than 70%. The composition containing only the triarylsulfonium $SbF_6^-$ salt (Comparative Example H) produced a highly cured, high $T_g$ material, but it was colored.

EXAMPLE 2

Evaluation of Properties of Comparative Formulations (No Added Salts) vs UV Exposure A stock solution of 36 g Tone 0201, 144 g ERL-4221 was mixed in a glass jar and placed in the oven at 100° C. for about 30 minutes to mix thoroughly before using. Individual curable composition samples were prepared by weighing out the desired amount of stock solution, UVI-6990 and UVI-6974 (Table 3) into a brown jar, heating the jars in an oven at 100° C. and mixing thoroughly. The compositions were allowed to cool to room temperature before proceeding. The amount used are described in Table 3, below.

TABLE 3

Comparative Formulations (no added salts) For UV Intensity Testing

| Comparative Sample | UVI-6990 | UVI-6974 | Stock Solution, 20% Tone 0201/80% ERL-4221 |
|---|---|---|---|
| I | 0.41 g | None | 20 g |
| J | 0.31 g | 0.10 g | 20 g |
| K | 0.25 g | 0.18 g | 20 g |
| L | 0.20 g | 0.22 g | 20 g |
| M | 0.15 g | 0.25 g | 20 g |
| N | 0.11 g | 0.31 g | 20 g |
| O | 0.05 g | 0.35 g | 20 g |
| P | None | 0.40 g | 20 g |

The compositions in Table 3, above, were cured using the 600W Fusion D (at 12.6 m/min) (548 J/pass) using the small sample technique (0.64 cm samples) followed by a post cure of 15 minutes at 50, 75, 100, 120 and 140° C. respectively. The exposed samples were evaluated for visual color. The visual color results are shown in Table 4, below.

TABLE 4

Visual Color of Cured Comparative Samples vs. Exposure Intensity

| Comparative Sample | 548 mj | 1096 mj | 2192 mj | 4384 mj |
|---|---|---|---|---|
| I | colorless | colorless | colorless | colorless d |
| J | colorless | colorless | colorless | color |
| K | colorless | colorless | very light color | color |
| L | colorless | colorless | very light color | more color |
| M | colorless | colorless | color | darker color |
| N | colorless | very light color | color | darker color |
| O | colorless | light color | more color | darkest color |
| P | colorless | color | darker color | darkest color |

The cured compositions were also evaluated using IR and MDSC and the results of those measurements are shown in Table 5, below.

TABLE 5

Measured Properties of Cured Comparative Formulations vs UV Intensity

| | 547 mj | | 1098 mj | | 2196 mj | | 4392 mj | |
|---|---|---|---|---|---|---|---|---|
| Comparative Sample | $T_g$, °C. MDSC | % Residual Epoxy from IR | $T_g$, °C. MDSC | % Residual Epoxy from IR | $T_g$, °C. MDSC | % Residual Epoxy from IR | $T_g$, °C. MDSC | % Residual Epoxy from IR |
| I | * | * | * | * | −9 | 47% | −3 | 36% |
| J | * | * | * | * | −16 | 35% | 56 | 9% |
| K | * | * | * | * | −16 | 28% | 73 | 0% |
| L | * | * | * | * | 62 | 23% | 71 | 0% |
| M | * | * | * | * | 63 | 14% | 71 | 0% |
| N | −31 | 59% | −15 | 40% | 82 | 0% | 74 | 0% |
| O | −21 | 41% | 79 | 7% | 77 | 0% | 81 | 0% |
| P | 70 | 9% | 82 | 0% | 83 | 0% | 73 | 0% |

*cure insufficient to make the measurement

The Comparative Examples J–O of Table 5 show that even over a larger dose range, it was not possible to obtain a fully cured high $T_g$ composition by mixing photochemically active salts of both inhibiting (UVI-6990) and accelerating anions (UVI-6974).

EXAMPLE 3

Addition of a Non-photochemically Active Salt Containing an Inhibiting Anion to a Formulation With a Photochemically Active Salt Containing an Accelerating Anion Individual curable composition samples were prepared by weighing out the amounts of TBA$^+$ PF$_6^-$, ERL-4221E and UVI-6990 or UVI-6974 into a brown jar as shown in Table 6 below, heating the jars in an oven at 100° C. and mixing thoroughly. The compositions were allowed to cool to room temperature before proceeding.

TABLE 6

Formulations With a Photochemically Active Salt Containing an Accelerating Anion with a Non-photochemically Active Salt Containing an Inhibiting Anion (Photocurative A)

| Sample | Additive | Catalyst | Epoxy |
|---|---|---|---|
| Q | None | 0.4 g UVI-6990 | 20.0 g ERL-4221E |
| 1 | 0.12 g TBA$^+$PF$_6^-$ | 0.4 g UVI-6974 | 20.0 g ERL-4221E |
| 2 | 0.10 g TBA$^+$PF$_6^-$ | 0.4 g UVI-6974 | 20.0 g ERL-4221E |
| 3 | 0.08 g TBA$^+$PF$_6^-$ | 0.4 g UVI-6974 | 20.0 g ERL-4221E |
| 4 | 0.06 g TBA$^+$PF$_6^-$ | 0.4 g UVI-6974 | 20.0 g ERL-4221E |
| 5 | 0.04 g TBA$^+$PF$_6^-$ | 0.4 g UVI-6974 | 20.0 g ERL-4221E |
| R | None | 0.4 g UVI-6974 | 20.0 g ERL-4221E |

DMA molds were used and the compositions were given a total of 4 J/cm$^2$ UVA dose using the 600W Fusion D system and a post cure as described in the sample preparation section. The cured compositions were evaluated visually for color. $T_g$ was determined by DMA, weight loss by TGA, and unreacted epoxy was determined by IR. The results of these evaluations are shown in Table 7, below.

TABLE 7

Properties of Cured Samples With A Photochemically Active Salt Containing An Accelerating Anion and A Non-photochemically Active Salt Containing An Inhibiting Anion (Photocurative A)

| Sample | Color | Degree of Cure (from IR) | $T_g$, °C. | % Weight Loss at 275° C. (TGA) |
|---|---|---|---|---|
| Q | colorless | 40% | 50 | 24.08% |
| 1 | colorless | 90% | 116(sh), 208 | 1.75% |
| 2 | very light yellow | >90% | 221 | 1.44% |
| 3 | light yellow | >90% | 214 | 1.42% |
| 4 | light yellow | >90% | 207 | 1.57% |
| 5 | light yellow/brown | >95% | 199 | 1.78% |
| R | yellow/brown | 100% | 182 | 3.93% | sh - shoulder peak

The data in Table 7, above, show that by using an optimal level of added inhibiting anion source in the presence of a photochemically active salt containing an accelerating anion (Photocurative A), it was possible to obtain a colorless or low color composition with a high $T_g$. The thermal stability of the cured compositions prepared above was tested using TGA. The TGA shows the samples containing photocuring system A, (Samples 1–5) lost less weight at 275° C. than samples without using Photocurative A (Comparative Samples Q and R).

EXAMPLE 4

Addition of a Non-photochemically Active Salt Containing an Accelerating Anion to a Formulation With a Photochemically Active Salt Containing an Accelerating Anion Individual curable composition samples were prepared by weighing out the amounts of TBA$^+$ SbF$_6^-$, Tone 0201, ERL-4221 and UVI-6974 into a brown jar shown in Table 8, below, heating the jars in an oven at 100° C. and mixing thoroughly The compositions were allowed to cool to room temperature before proceeding.

TABLE 8

Formulations With a Photochemically Active Salt Containing an Accelerating Anion with a Non-photochemically Active Salt Containing an Accelerating Anion

| Comparative Sample | Accelerating Anion Source | CD1010 | Tone 0201 | ERL-4221 |
|---|---|---|---|---|
| S | None | 0.4 g | 4 g | 16 g |
| T | 0.2 g TBA$^+$SbF$_6^-$ | 0.4 g | 4 g | 16 g |
| U | 0.1 g TBA$^+$SbF$_6^-$ | 0.4 g | 4 g | 16 g |
| V | 0.05 g TBA$^+$SbF$_6^-$ | 0.4 g | 4 g | 16 g |
| W | 0.025 g TBA$^+$SbF$_6^-$ | 0.4 g | 4 g | 16 g |

DMA molds were used and the compositions were given a total of 4 J/cm$^2$ UVA dose using the 600W Fusion D system and a post cure as described in the sample preparation section. The cured compositions were evaluated visually for color, T$_g$ was determined by DMA, and unreacted epoxy was determined by IR The results of these evaluations are shown in Table 9, below.

TABLE 9

Properties of Cured Samples With A Photochemically Active Salt Containing An Accelerating Anion and A Non-photochemically Active Salt Containing An Accelerating Anion

| Comparative Sample | Degree of Cure From IR | Color | T$_g$, ° C. | % Weight Loss at 275° C. (TGA) |
|---|---|---|---|---|
| S | 100% | light yellow | 120 | 2.45 |
| T | 100% | light yellow | 115 | 3.74 |
| U | 100% | light yellow | 115 | 3.22 |
| V | 100% | light yellow | 116 | 3.29 |
| W | 100% | light yellow | 127 | 3.33 |

The data in Table 9 show that the addition of the salt of an accelerating anion to a salt of a photochemically active accelerating anion had no effect on color, residual epoxy of T$_g$ of the cured composition. However, this addition decreased the thermal stability of the cured systems as shown by the TGA data in Table 9. Comparative Samples T–W with various amounts of added accelerating anions lost more weight than Comparative Example S which contained no added anions.

EXAMPLE 5

Formulation with Photocurative A (tetraphenylborate Anion)

Individual curable composition samples were prepared by weighing out the desired amount TBA$^+$ TBP$^-$ (tetraphenylborate), UVI-6974, Tone 0201 and ERL-4221 into a brown jar, heating the jars in an oven at 100° C. and mixing thoroughly. The compositions were allowed to cool to room temperature before proceeding. The amounts used are described in Table 10, below.

TABLE 10

Epoxy Formulations with Photocurative A (tetraphenylborate anion)

| Sample | Non Photochemically Active Salt | UVI-6974 | Polyol | Epoxy |
|---|---|---|---|---|
| X | None | 0.4 g | 4 g Tone 0201 | 16 g ERL-4221 |
| 6 | 0.10 g TBA$^+$TPB$^-$ | 0.4 g | 4 g Tone 0201 | 16 g ERL-4221 |
| 7 | 0.10 g TBA$^+$TPB$^-$ | 0.4 g | 4 g Tone 0201 | 16 g ERL-4221 |
| 8 | 0.06 g TBA$^+$TPB$^-$ | 0.4 g | 4 g Tone 0201 | 16 g ERL-4221 |
| 9 | 0.04 g TBA$^+$TPB$^-$ | 0.4 g | 4 g Tone 0201 | 16 g ERL-4221 |
| 10 | 0.02 g TBA$^+$TPB$^-$ | 0.4 g | 4 g Tone 0201 | 16 g ERL-4221 |
| 11 | 0.01 g TBA$^+$TPB$^-$ | 0.4 g | 4 g Tone 0201 | 16 g ERL-4221 |
| 12 | 0.005 g TBA$^+$TPB$^-$ | 0.4 g | 4 g Tone 0201 | 16 g ERL-4221 |

DMA molds were used and the compositions were given a total of 4 J/cm$^2$ UVA dose using the 600W Fusion D system and a post cure as described in the sample preparation section. The cured compositions were evaluated visually for color, T$_g$ was determined by DMA and unreacted epoxy was determined was by IR. The results of these evaluation are shown in Table 11, below.

TABLE 11

Physical Properties of Cured Compositions with Photocurative A (tetraphenylborate anion)

| Sample | % Conversion from IR | Color | T$_g$, ° C. | % Weight Loss at 275° C. (TGA) |
|---|---|---|---|---|
| X | 100% | brown | 103 | 3.00 |
| 6 | 100% | very light brown | 119 | 2.31 |
| 7 | 100% | light brown | 112 | 2.45 |
| 8 | 100% | brown | 105 | 2.77 |
| 9 | 100% | brown | 104 | 2.81 |
| 10 | 100% | brown | 103 | 2.80 |
| 11 | 100% | brown | 104 | 2.96 |
| 12 | 100% | brown | 110 | 2.78 |

The data of Table 11, above, show, in comparison to Sample X, that the use of Photocurative A wherein tetraphenylborate was the inhibiting anion, reduced the color in Sample 6 and 7 and increased the T$_g$ of the cured composition of Samples 6–9, 11 and 12. The thermal stability of Samples 6–12 increased (less weight loss at 275° C.).

EXAMPLE 8

Formulations with Photocurative A (p-toluenesulfonate Anion)

Individual curable composition samples were prepared by weighing out the amount of TBA$^+$ PTS$^-$ (p-toluenesulfonate), UVI-6974, Tone 0201 and ERL-4221 shown in Table 12, below, into a brown jar, heating the jars in an oven at 100° C. and mixing thoroughly. The compositions were allowed to cool to room temperature before proceeding.

TABLE 12

Epoxy Formulations with Photocurative A (p-toluenesulfonate Anion)

| Sample | Amount of TBA$^+$PTS$^-$ | CD-1010 | Polyol | Epoxy |
|---|---|---|---|---|
| 13 | 0.10 g | 0.4 g | 4 g Tone 0201 | 16 g ERL-4221 |
| 14 | 0.08 g | 0.4 g | 4 g Tone 0201 | 16 g ERL-4221 |
| 15 | 0.04 g | 0.4 g | 4 g Tone 0201 | 16 g ERL-4221 |

TABLE 12-continued

Epoxy Formulations with Photocurative A (p-toluenesulfonate Anion)

| Sample | Amount of TBA⁺PTS⁻ | CD-1010 | Polyol | Epoxy |
|---|---|---|---|---|
| 16 | 0.02 g | 0.4 g | 4 g Tone 0201 | 16 g ERL-4221 |
| 17 | 0.01 g | 0.4 g | 4 g Tone 0201 | 16 g ERL-4221 |
| 18 | 0.005 g | 0.4 g | 4 g Tone 0201 | 16 g ERL-4221 |
| Y | None | 0.4 g | 4 g Tone 0201 | 16 g ERL-4221 |

DMA molds were used and the compositions were given a total of 4 J/cm² UVA dose using the 600W Fusion D system and a post cure as described in the sample preparation section. The cured compositions were evaluated visually for color, $T_g$ was determined by DMA and unreacted epoxy was determined by IR. The results of these evaluations are shown in Table 13, below.

TABLE 13

Physical Properties of Cured Compositions with Photocurative A (p-toluenesulfonate anion)

| Sample | Degree of Cure From IR | Color | $T_g$, °C. |
|---|---|---|---|
| 13 | 100% | colorless | 143 |
| 14 | 100% | very light yellow | 127 |
| 15 | 100% | very light yellow | 116 |
| 16 | 100% | yellow | 123 |
| 17 | 100% | yellow | 122 |
| 18 | 100% | yellow | 120 |
| Y | 100% | yellow | 120 |

The data of Table 13, above, show, compared to Sample Y, that the use of Photocurative A comprising p-toluenesulfonate as the inhibiting anion reduced the color in Samples 13–15 and maintained or increased the $T_g$ of the cured composition in Samples 13–17.

EXAMPLE 7

Formulations with Photocurative A (Tetrafluoroborate Anion)

Individual curable composition samples were prepared by weighing out the amount of TBA⁺ BF₄⁻, CD-1010, Tone 0201 and ERL-4221 shown in Table 14, below, into a brown jar, heating the jars in an oven at 100° C. and mixing thoroughly. The compositions were allowed to cool to room temperature before proceeding.

TABLE 14

Epoxy Formulations with Photocurative A (tetrafluoroborate anion)

| Sample | TBA⁺BF₄⁻ | CD-1010 | Polyol | Epoxy |
|---|---|---|---|---|
| Z | 0.2 g | 0.4 g | 4 g Tone 0201 | 16 g ERL-4221 |
| 19 | 0.1 g | 0.4 g | 4 g Tone 0201 | 16 g ERL-4221 |
| 20 | 0.09 g | 0.4 g | 4 g Tone 0201 | 16 g ERL-4221 |
| 21 | 0.08 g | 0.4 g | 4 g Tone 0201 | 16 g ERL-4221 |
| 22 | 0.07 g | 0.4 g | 4 g Tone 0201 | 16 g ERL-4221 |
| 23 | 0.06 g | 0.4 g | 4 g Tone 0201 | 16 g ERL-4221 |
| 24 | 0.05 g | 0.4 g | 4 g Tone 0201 | 16 g ERL-4221 |
| 25 | 0.025 g | 0.4 g | 4 g Tone 0201 | 16 g ERL-4221 |

DMA molds were used and the compositions were given a total of 4 J/cm² UVA dose using the 600W Fusion D system and a post cure as described in the sample preparation section. The cured compositions were evaluated visually for color, $T_g$ was determined by DMA and unreacted epoxy was determined by IR The results of these evaluations are shown in Table 15, below.

TABLE 15

Physical Properties of Cured Compositions with Photocurative A (tetrafluoroborate anion)

| Sample | Estimate of Degree of Cure From IR | Color | $T_g$, °C. |
|---|---|---|---|
| Z | essentially no cure | colorless | too sticky to run |
| 19 | 75% | colorless | 1,139 |
| 20 | 70% | colorless | −14 (sample broke) |
| 21 | 90% | very light yellow | 136 |
| 22 | 100% | very light yellow | 137 |
| 23 | 100% | very light yellow | 127 |
| 24 | 100% | light brown | 122 |
| 25 | 100% | light brown | 116 |

The data of Table 15, above, show that the use of Photocurative A with tetrafluoroborate as the inhibiting anion increased the degree of cure with optimum amounts of tetrafluoroborate anion (Samples 25–21) and provided satisfactory $T_g$ values of the cured compositions in Samples 25–21 and 19. The addition of high amounts of tetrafluoroborate anion had detrimental effects on the degree of cure (Samples 19 and 20). For example, Comparative Sample Z, with the highest amount of tetrafluoroborate anion produced a composition with poor physical properties.

EXAMPLE 8

Formulations With Photocurative A and Various Epoxy Formulations

Individual curable composition samples were prepared by weighing out the amount of TBA⁺ PF₆⁻, UVI-6974, polyol and epoxy in Table 16, below, into a brown jar, heating the jars in an oven at 100° C. and mixing thoroughly. The compositions were allowed to cool to room temperature before proceeding.

TABLE 16

Formulations with Photocurative A and Various Polyols and Epoxies

| Sample | TBA⁺PF₆⁻ | UVI-6974 | Polyol | Epoxy |
|---|---|---|---|---|
| AA | — | 0.4 g | 4 g Polyproylene glycol 425 | 16 g ERL-4221 |
| 26 | 0.12 g | 0.4 g | 4 g Polyproylene glycol 425 | 16 g ERL-4221 |
| BB | — | 0.4 g | 4 g PolyTHF 250 | 16 g ERL-4221 |
| 27 | 0.12 g | 0.4 g | 4 g PolyThF 250 | 16 g ERL-4221 |
| CC | — | 0.4 g | 4 g Synfac 8017 | 16 g ERL-4221 |
| 28 | 0.12 g | 0.4 g | 4 g Synfac 8017 | 16 g ERL-4221 |
| DD | — | 0.4 g | 2 g MPDIOL | 18 g ERL-4221 |
| 29 | 0.12 g | 0.4 g | 2 g MPDIOL | 18 g ERL-4221 |
| EE | — | 0.4 g | 4 g Polyproylene glycol 425 | 16 g Epon 828 |
| 30 | 0.12 g | 0.4 g | 4 g Polyproylene glycol 425 | 16 g Epon 828 |
| FF | — | 0.4 g | 4 g PolyTHF 250 | 16 g Epon 828 |
| 31 | 0.12 g | 0.4 g | 4 g PolyTHF 250 | 16 g Epon 828 |

DMA molds were used and the compositions were given a total of 4 J/cm² UVA dose using the 600W Fusion D system and a post cure as described in the sample preparation section. The cured compositions were evaluated visually for color, $T_g$ was determined by DMA and the amount of unreacted epoxy was determined by IR. The results of these evaluations are shown in Table 17, below.

TABLE 17

Physical Properties of Formulations with Photocurative A

| Sample | Color | Estimate of Degree of Cure From IR | $T_g$, °C. |
|---|---|---|---|
| AA | dark brown | 100% | 109 |
| 26 | Colorless | 100% | 65, 122 |
| BB | Brown | 100% | 104 |
| 27 | Colorless | 100% | 64, 116 |
| CC | Brown | 100% | 133 |
| 28 | Colorless | >90% | 36, 147 |
| DD | light brown | 100% | 143 |
| 29 | Colorless | >90% | 74, 158 |
| EE | dark brown/gray | 100% | 67 |
| 30 | Colorless | 95% | 66 |
| FF | very light brown | 100% | 56 |
| 31 | Colorless | 99% | 67 |

The data of Table 17 above show that the use of Photocurative A in various epoxy compositions reduced the color and in most cases increased the $T_g$ of the cured compositions as compared to Comparative Samples without the addition of the salt of a non photochemically active inhibiting salt. The degree of cure was maintained in some Samples.

EXAMPLE 9

Addition of a Non-photochemically Active Salt Containing an Accelerating Anion to a Formulation With a Photochemically Active Salt Containing an Inhibiting Anion (Photocurative B)

Curable compositions were prepared using the general sample preparation method described above. DMA molds were used and the samples were given a total of 4 J/cm2 dose using the 600W Fusion D system and a post cure as described in the sample preparation section. The amounts of material used and the results of the DMA, TGA, IR and visual color evaluations are shown in Table 18, below.

TABLE 18

Properties of Epoxy Formulations With A Photochemically Active Salt Containing and Inhibiting Anion With a Non-photochemically Active Salt Containing and Accelerating Anion (Photocurative B)

| Sample | ERL4221/Tone 0201 | UVI-6990 | TBA$^+$ SbF$_6^-$ | $T_g$, °C. | Color | Degree of Cure From IR | % Weight Loss at 275° C. (TGA) |
|---|---|---|---|---|---|---|---|
| GG | 16 g/4 g | 0.4 g | none | 45.1 | colorless | 68% | 11 |
| 32 | 16 g/4 g | 0.4 g | 0.04 g | 56.2 | colorless | 86% | 7 |
| 33 | 16 g/4 g | 0.4 g | 0.08 g | 84.5 | colorless | 88% | 6.5 |
| 34 | 16 g/4 g | 0.4 g | 0.12 g | 101.2 | colorless | 95% | 5.5 |
| 35 | 16 g/4 g | 0.4 g | 0.16 g | 121.5 | colorless | 98% | 5 |

The data in Table 18 show that without the use of Photocurative B, a colorless but incompletely cured and low $T_g$ composition (Comparative Example GG) was obtained. The data further show that the addition of an accelerating anion source to a photochemical inhibiting anion salt produced a colorless system with a high $T_g$. There were additional benefits for the addition of the accelerating anion source in the area of thermal stability of the cured compositions. The thermal stability of the cured compositions prepared above was evaluated using TGA and the data of Table 18 above show increased thermal stability when Photocurative B was in the composition.

EXAMPLE 10

Formulations With Added Accelerating Anion

Curable compositions were prepared using the general sample preparation method described above. DMA molds were used and the samples were given a total of 4 J/cm$^2$ dose using the 600W Fusion D system and a post cure as described in the sample preparation section. The amounts of material used are shown in Table 19, below.

TABLE 19

Formulations With and Without Photocurative B

| Sample | ERL-4221 | Tone 0201 | UVI-6974 | UVI-6990 | TBA$^+$ Methide$^-$ |
|---|---|---|---|---|---|
| HH | 16 g | 4 g | 0.4 g | none | 0.0 |
| II | 16 g | 4 g | 0.4 g | none | 0.2 |
| JJ | 16 g | 4 g | 0.4 g | none | 0.4 |
| KK | 16 g | 4 g | 0.4 g | none | 0.6 |
| LL | 16 g | 4 g | 0.4 g | none | 0.8 |
| MM | 16 g | 4 g | 0.4 g | none | 1.0 |
| NN | 16 g | 4 g | 0.4 g | none | 1.2 |
| OO | 16 g | 4 g | none | 0.4 g | 0.0 |
| 36 | 16 g | 4 g | none | 0.4 g | 0.2 |
| 37 | 16 g | 4 g | none | 0.4 g | 0.4 |
| 38 | 16 g | 4 g | none | 0.4 g | 0.6 |
| 39 | 16 g | 4 g | none | 0.4 g | 0.8 |
| 40 | 16 g | 4 g | none | 0.4 g | 1.0 |
| 41 | 16 g | 4 g | none | 0.4 g | 1.2 |

Properties of the samples formulated according to Table 19, above, are shown in Tables 20 and 21, below.

TABLE 20

Physical Properties of Cured Compositions with Photochemically Active Salts Containing an Accelerating Anion and an Added Accelerating Anion (Methide)

| Sample | $T_g$, °C. | % Weight Loss at 275° C. (TGA) | Color |
|---|---|---|---|
| HH | 110.3 | 2.5 | amber |
| II | 105.4 | 2.5 | amber |
| JJ | 102.1 | 2.5 | amber |

TABLE 20-continued

Physical Properties of Cured Compositions with Photochemically Active Salts Containing an Accelerating Anion and an Added Accelerating Anion (Methide)

| Sample | $T_g$, °C. | % Weight Loss at 275° C. (TGA) | Color |
|---|---|---|---|
| KK | 102.2 | 2.5 | amber |
| LL | 102.8 | 2.5 | amber |
| MM | 101.8 | 2.5 | amber |
| NN | 104.1 | 2.5 | amber |

The data in Table 20 show the properties of cured compositions of a photochemically active salt containing an accelerating anion (UVI-6974) with added accelerating anion (methide anion). The results show that the addition of the accelerating anion resulted in poor color and some decrease in the $T_g$.

TABLE 21

Physical Properties of Cured Compositions with Photocurative B (Methide)

| Sample | $T_g$, °C. | % Weight Loss at 275° C. (TGA) | Color |
|---|---|---|---|
| OO | 35.8 | 12.0 | colorless |
| 36 | 44.8 | 11.5 | colorless |
| 37 | 49.0 | 8.0 | colorless |
| 38 | 78.2 | 8.5 | colorless |
| 39 | 51.9 | 8.5 | colorless |
| 40 | 60.0 | 5.5 | colorless |
| 41 | 64.1 | 6.5 | colorless |

The data of samples in Table 21 show that without the use of Photocurative B a colorless but incompletely cured, low $T_g$ composition (see Comparative Example OO) was obtained. The data show that by using an optimum level of added accelerating anion source with a photochemical inhibiting anion salt, a colorless system with improved physical properties was obtained. (Samples 36–41 compared to Comparative Sample OO).

EXAMPLE 11

Formulations With Photocurative B (Trifluoromethyl Sulfonate Anion)

Curable compositions were prepared using the general sample preparation method described above. These compositions were cured using the 600W Fusion D and were given a dose of 1 J/cm², followed by the standard post cure of 15 minutes at 50, 75, 100, 120 and 140° C. The amounts of material used and the results of the TGA, IR and visual color evaluations are shown in Table 22 and 23, below.

TABLE 22

Formulations with Photocurative B (trifluoromethyl sulfonate salt)

| Sample | Photochemically active salt 1 | Photochemically active salt 2 | Additive | 20% Tone 0201/ 80% UVR-6110 |
|---|---|---|---|---|
| PP | none | 0.4 g UVI-6990 | None | 20 g |
| 42 | none | 0.4 g UVI-6990 | 0.03 g FC-122 | 20 g |
| 43 | none | 0.4 g UVI-6990 | 0.04 g FC-122 | 20 g |

TABLE 22-continued

Formulations with Photocurative B (trifluoromethyl sulfonate salt)

| Sample | Photochemically active salt 1 | Photochemically active salt 2 | Additive | 20% Tone 0201/ 80% UVR-6110 |
|---|---|---|---|---|
| 44 | none | 0.4 g UVI-6990 | 0.08 g FC-122 | 20 g |
| 45 | none | 0.4 g UVI-6990 | 0.12 g FC-122 | 20 g |
| QQ | 0.4 g UVI-6974 | none | none | 20 g |

TABLE 23

Physical Properties or Formulations with Photocurative B (Trifluoromethyl Sulfonate Anion) after exposure to 1 Joule/cm² UV radiation (Fusion D)

| Sample | Color | % Weight Loss 275° C. (TGA) | % Cure by IR |
|---|---|---|---|
| PP | Colorless | 26 | 70 |
| 42 | Colorless | 4 | 85 |
| 43 | Colorless | 3 | 100 |
| 44 | light yellow | 3.5 | 100 |
| 45 | Yellow | 4 | 100 |
| QQ | Yellow | 3.5 | 100 |

The data of Table 23, above, show that without the use of Photocurative B either colorless but incompletely cured, low $T_g$ compositions (Comparative Example PP) or completely cured high $T_g$ compositions that were colored (Comparative Example QQ) were obtained. The thermal stability of the cured compositions prepared above was tested using TGA. The results of those evaluations show that the samples with added trifluoromethyl sulfonate anion had greater thermal stability than Sample PP without added trifluoromethyl sulfonate.

EXAMPLE 12

Formulations with Photocurative B and Various Epoxy Formulations

Curable compositions were prepared using the general sample preparation method described above. DMA molds were used and the samples were given a total of 4 J/cm² dose using the 600W Fusion D system and a post cure as described in the sample preparation section. The amounts of material used and the results of the DMA and IR evaluations are shown in Table 24, below.

TABLE 24

Physical Properties of Formulations with Photocurative B

| Sample | TBA⁺ SbF₆⁻ | UVI-6990 | Epoxy | Polyol | $T_g$, °C. | % Weight Loss at 275° C. (TGA) |
|---|---|---|---|---|---|---|
| RR | no additive | 0.4 g | 16 g ERL-4221 | 4 g Polypropylene Glycol 425 | 27.5 | 18 |
| 46 | 0.16 g | 0.4 g | 16 g ERL-4221 | 4 g Polypropylene Glycol 425 | 87.4 | 6 |
| SS | no additive | 0.4 g | 16 g ERL-4221 | 4 g PolyTHF 250 | 69.6 | 6.5 |
| 47 | 0.16 g | 0.4 g | 16 g ERL-4221 | 4 g PolyTHF 250 | 122.9 | 3.5 |

TABLE 24-continued

Physical Properties of Formulations with Photocurative B

| Sample | TBA$^+$ SbF$_6^-$ | UVI-6990 | Epoxy | Polyol | T$_g$, °C. | % Weight Loss at 275° C. (TGA) |
|---|---|---|---|---|---|---|
| TT | no additive | 0.4 g | 16 g ERL-4221 | 4 g Synfac 8017 | 54.5 | 8.5 |
| 48 | 0.16 g | 0.4 g | 16 g ERL-4221 | 4 g Synfac 8017 | 129.5 | 5.5 |
| UU | no additive | 0.4 g | 16 g ERL-4221 | 2 g MPDIOL | 60.5 | 10 |
| 49 | 0.16 g | 0.4 g | 16 g ERL-4221 | 2 g MPDIOL | 135.6 | 5 |

The data of Table 24, above, show that the use of Photocurative B improved thermal stability and increased T$_g$ of cured materials having a wide variety of formulations.

EXAMPLE 13

Addition of a Photochemically Active Salt Containing an Accelerating Anion to a Formulation With a Photochemically Active Salt Containing an Inhibiting Anion Curable compositions were prepared using the general sample preparation method described above. These compositions were cured using a 600W Fusion D UV exposure system. The samples were given a dose of 4 J/cm², followed by the standard post cure of 15 minutes at 50, 75, 100, 120 and 140° C. The amounts of material used and the results of the TGA and visual color evaluation tests are shown in Table 24, below.

TABLE 25

Formulations and Properties of Epoxy Systems

| Sample | ERL-4221 | Tone 0201 | UVI-6974 | UVI-6990 | % Weight Loss at 275° C. (TGA) | Color |
|---|---|---|---|---|---|---|
| VV | 16 g | 4 g | 0.4 g | 0 g | 3.5 | amber |
| WW | 16 g | 4 g | 0.4 g | 0.1 g | 3.5 | amber |
| XX | 16 g | 4 g | 0.4 g | 0.2 g | 4 | amber |
| YY | 16 g | 4 g | 0.4 g | 0.3 g | 4 | amber |
| ZZ | 16 g | 4 g | 0.4 g | 0.4 g | 5 | amber |
| AAA | 16 g | 4 g | 0.3 g | 0.4 g | 5.5 | amber |
| BBB | 16 g | 4 g | 0.2 g | 0.4 g | 6 | yellow |
| CCC | 16 g | 4 g | 0.1 g | 0.4 g | 7 | light yellow |
| DDD | 16 g | 4 g | 0 g | 0.4 g | 10.5 | colorless |

These data show that epoxy compositions that contained both a photochemically active salt of an inhibiting anion and a photochemically active salt of an accelerating anion did not produce colorless, thermally stable cured compositions. Only the PF$_6^-$ containing composition (Comparative DDD) produced a colorless material but its thermal stability, was the poorest.

Various modifications and alternations of this invention will become apparent to those skilled in the art without departing from the scope and intent of this invention, and it should be understood that this invention is not to be unduly limited to the illustrative embodiments set forth herein.

We claim:

1. A photocurable composition comprising
   a) at least one cationically curable monomer, and
   b) a curing agent comprising Photocurative A or Photocurative B, wherein Photocurative A comprises
      1) an effective amount of an accelerating photochemically active salt comprising a photochemically active cation and an accelerating anion, and
      2) an effective amount of an inhibiting non-photochemically active salt comprising a non-photochemically active cation and an inhibiting anion; and
   Photocurative B comprises
      1) an effective amount of an inhibiting photochemically active salt comprising a photochemically active cation and an inhibiting anion, and
      2) an effective amount of an accelerating non-photochemically active salt comprising a non-photochemically active cation and an accelerating anion;
         wherein the inhibiting and accelerating anions are defined by photo differential scanning calorimetry (pDSC) and thermal differential scanning calorimetry (tDSC) such that anions of triarylsulfonium salts that have a total DSC exotherm energy value of 0 to 300 Joules per gram (J/g) are classified as inhibiting anions, and anions of triarylsulfonium salts that have a total DSC exotherm energy value greater than 300 to 750 Joules per gram (J/g) are classified as accelerating anions.

2. The curable composition according to claim 1 wherein said inhibiting photochemically active salt has a total DSC exotherm energy in the range of 0 to 250 J/g.

3. The curable composition according to claim 1 wherein said inhibiting photochemically active salt has a total DSC exotherm energy in the range of 0 to 200 J/g.

4. The curable composition according to claim 1 wherein said accelerating photochemically active salt has a total DSC exotherm energy in the range of greater than 300 to 750 J/g.

5. The curable composition according to claim 1 wherein said accelerating photochemically active salt has a total DSC exotherm energy in the range of 325 to 600 J/g.

6. The curable composition according to claim 1 wherein said accelerating photochemically active salt has a total DSC exotherm energy in the range of 350 to 500 J/g.

7. The curable composition according to claim 1 wherein said cationically curable monomer is selected from the group consisting of 1,2-, 1,3-, and 1,4-cyclic ethers (also designated as 1,2-, 1,3-, and 1,4-epoxides), vinyl ethers, N-vinyl compounds, ethylenically unsaturated hydrocarbons, cyclic formals, and cyclic organosiloxanes.

8. The curable composition according to claim 1 wherein said cationically curable monomer is selected from the group consisting of epoxy monomers and vinyl ethers.

9. The curable composition according to claim 1 wherein said cationically curable monomer is an epoxy monomer.

10. The curable composition according to claim 1 wherein said composition further comprises a free radically polymerizable monomer.

11. The curable composition according to claim 1 further comprising one or more mono or poly-alcohols or blends thereof.

12. The curable composition according to claim 10 wherein said free radically polymerizable monomer is an acrylate or methacrylate.

13. The curable composition according to claim 1 comprising a bifunctional monomer comprising of at least one cationically polymerizable functionality or a functionality that copolymerizes with a cationically curable monomer.

14. The curable composition according to claim 13 wherein said bifunctional monomer comprises at least one free-radically curable functionality.

15. The curable composition according to claim 1 wherein said accelerating photochemically active salt of Photocurative A comprising a photochemically active cation and an accelerating anion is selected from the group consisting of iodonium, sulfonium, and cationic organometallic salts of $AsF_6^-$, $SbF_6^-$, $CF_3SO_3^-$, $HC(SO_2CF_3)_2^-$, $C(SO_2CF_3)_3^-$, $N(SO_2CF_3)_2^-$, tetra(pentafluorophenyl)borate, and tetra(3,5-bistrifluoromethylphenyl)borate.

16. The curable composition according to claim 1 wherein said inhibiting non-photochemically active salt comprising a non-photoactive cation and an inhibiting anion is selected from the group consisting of tetraalkylammonium, phosphonium, pyridinium, benzothiazolium, benzooxazolium, $Li^+$, $Na^+$, $K^+$, $Cs^+$, and $Ca^{+2}$, salts of $BF_4^-$, $PF_6^-$, p-toluenesulfonate, and tetraphenylborates.

17. The curable composition according to claim 1 wherein said inhibiting photochemically active salt of Photocurative B comprising a photochemically active cation and an inhibiting anion is selected from the group consisting of iodonium, sulfonium, and organometallic salts of $BF_4^-$, $PF_6^-$, p-toluenesulfonate, and tetraphenylborates.

18. The curable composition according to claim 1 wherein said accelerating non-photochemically active salt of Photocurative B comprising a non-photochemically active cation and an accelerating anion is selected from the group consisting of tetraalkylammonium, phosphonium, pyridinium, benzothiazolium, benzooxazolium, $Li^+$, $Na^+$, $K^+$, $Cs^+$, and $C^{+2}$ salts of $AsF_6^-$, $SbF_6^-$, $CF_3SO_3^-$, $C(SO_2CF_3)_3^-$, $HC(SO_2CF_3)_2^-$, $CF_3SO_3^-$, $N(SO_2CF_3)_2^-$, tetra(pentafluorophenyl)borate, and tetra(3,5-bisfluoromethylphenyl)borate.

19. The curable composition according to claim 1 wherein said inhibiting anion of said photochemically active salt is selected from the group consisting of $BF_4^-$, $PF_6^-$, tetraphenylborate, and p-toluenesulfonate.

20. The curable composition according to claim 1 wherein said photochemically active salt is present in the range of 0.01 to 20% based on the weight of total monomer.

21. The curable composition according to claim 1 wherein said non-photochemically active salt is present in the range of 0.01 to 10% based on the weight of total monomer.

22. The curable composition according to claim 10 further comprising a free radical initiator.

23. A curing agent for the polymerization of a cationic monomer comprising Photocurative A or Photocurative B, wherein Photocurative A comprises
  a) an effective amount of an accelerating photochemically active salt comprising a photochemically active cation and an accelerating anion, and
  b) an effective amount of an inhibiting non-photochemically active salt comprising a non-photoactive cation and an inhibiting anion; and Photocurative B comprises
  a) an effective amount of an inhibiting photochemically active salt comprising a photochemically active cation and an inhibiting anion, and
  b) an effective amount of an accelerating non-photochemically active salt comprising a non-photochemically active cation and an accelerating anion;

wherein the inhibiting and accelerating anions are defined by photo differential scanning calorimetry (pDSC) and thermal differential scanning calorimetry (tDSC) such that anions of triarylsulfonium salts that have a total DSC exotherm energy value of 0 to 300 Joules per gram (J/g) are classified as inhibiting anions, and anions of triarylsulfonium salts that have a total DSC exotherm energy value greater than 300 to 750 Joules per gram (J/g) are classified as accelerating anions.

24. A method for polymerizing a cationically polymerizable composition comprising the steps of
  a) admixing at least one cationically curable monomer and a curing agent comprising Photocurative A or Photocurative B to form an admixture; and p1 b) subjecting said admixture to photocuring conditions to effect polymerization of said composition, wherein
Photocurative A comprises
  1) an effective amount of an accelerating photochemically active salt comprising a photochemically active cation and an accelerating anion, and
  2) an effective amount of an inhibiting non-photochemically active salt comprising a non-photoactive cation and an inhibiting anion; and Photocurative B comprises
  1) an effective amount of an inhibiting photochemically active salt comprising a photochemically active cation and an inhibiting anion, and
  2) an effective amount of an accelerating non-photochemically active salt comprising a non-photochemically active cation and an accelerating anion;

wherein the inhibiting and accelerating anions are defined by photo differential scanning calorimetry (pDSC) and thermal differential scanning calorimetry (tDSC) such that anions of triarylsulfonium salts that have a total DSC exotherm energy value of 0 to 300 Joules per gram (J/g) are classified as inhibiting anions, and anions of triarylsulfonium salts that have a total DSC exotherm energy value greater than 300 to 750 Joules per gram (J/g) are classified as accelerating anions.

* * * * *

UNITED STATES PATENT AND TRADEMARK OFFICE
CERTIFICATE OF CORRECTION

PATENT NO. : 6,777,460 B2
APPLICATION NO. : 10/328520
DATED : August 17, 2004
INVENTOR(S) : Palazzotto, Michael C.

It is certified that error appears in the above-identified patent and that said Letters Patent is hereby corrected as shown below:

Column 3,
Line 18, delete "defmed" and insert -- defined --.

Column 4,
Line 57, delete "(3,4epoxycyclohexyl)" and insert -- (3,4-epoxycyclohexyl) --.
Lines 57-58, delete "3,4-epoxycylclohexyl-5,5-spiro-3,4epoxy" and insert
-- 3,4-epoxycyclohexyl-5,5-spiro-3,4-epoxy --.

Column 5,
Line 8, delete "L207" and insert -- L-207 --.
Line 27, delete "p2,3-epoxypropoxy)" and insert
-- p-(2,3-epoxypropoxy) --.
Line 61, delete "2,2dimethyl" and insert -- 2,2-dimethyl --.
Line 64, delete "1,2,6hexanetriol" and insert -- 1,2,6-hexanetriol --.

Column 6,
Line 1, delete "1,4cyclohexanedimethanol" and insert -- 1,4-cyclohexanedimethanol --.
Line 1, delete "1,4benzene" and insert -- 1,4-benzene --.

Column 7,
Line 2, delete "1,4cyclohexanedinol" and insert -- 1,4-cyclohexanediol --.
Line 40, delete "2diphenylethanone" and insert -- 2-diphenylethanone --.
Line 41, delete "1-hydroxy-cyclohexylphenol" and insert -- 1-hydroxy-cyclohexylphenyl --.

Column 10,
Line 20, delete "fr" and insert -- Ir --.
Line 47, delete "X$^-$;" and insert -- X$^-$, --.

Column 11,
Line 20, delete "ILA" and insert -- IIA --.
Line 52, delete "beat" and insert -- heat --.

Column 13,
Line 14, delete "CD1010" and insert -- CD-1010 --.
Line 61, delete "Al1" and insert -- AII --.

UNITED STATES PATENT AND TRADEMARK OFFICE
CERTIFICATE OF CORRECTION

PATENT NO. : 6,777460 B2
APPLICATION NO. : 10/328520
DATED : August 17, 2004
INVENTOR(S) : Palazzotto, Michael C.

It is certified that error appears in the above-identified patent and that said Letters Patent is hereby corrected as shown below:

Column 14,
Line 5, delete "(he" and insert -- the --.
Line 35, delete "WVA" and insert -- UVA --.

Column 16,
Line 1, delete "250 nl" and insert -- 250 ml --.

Column 17,
Line 35, delete "out" and insert -- out. --.
Line 47, delete "0201,80%" and insert -- 0201/80% --.

Column 18,
Line 6, delete "comprised." and insert -- comprised: --.

Column 19,
Line 20, delete "$C(SO_2CF_3F_3)_3$" and insert -- $C(SO_2CF_3)_3$ --.

Column 23,
Line 50, delete "of" and insert -- or --.

Column 24,
Line 9, delete "0.10 g" and insert -- 0.08 g --.
Line 46, delete "EXAMPLE 8" and insert -- EXAMPLE 6 --.

Column 26,
Line 2, after "IR" insert -- . --.
Line 52, delete "PolyThF250" and insert -- PolyTHF 250 --.

Column 27,
Line 24, delete "Samples" and insert -- samples --.

Column 31,
Line 56, after "stability" delete ",".

UNITED STATES PATENT AND TRADEMARK OFFICE
CERTIFICATE OF CORRECTION

PATENT NO.       : 6,777460 B2
APPLICATION NO.  : 10/328520
DATED            : August 17, 2004
INVENTOR(S)      : Palazzotto, Michael C.

It is certified that error appears in the above-identified patent and that said Letters Patent is hereby corrected as shown below:

Column 32,
Line 56, delete "mono" and insert -- mono– --.

Column 33,
Line 28, delete "$C^{+2}$" and insert -- $Ca^{+2}$ --.

Signed and Sealed this

Twenty-fifth Day of July, 2006

JON W. DUDAS
*Director of the United States Patent and Trademark Office*